(12) United States Patent
Alexander

(10) Patent No.: US 10,876,685 B2
(45) Date of Patent: Dec. 29, 2020

(54) LUBRICATOR PUMP ADJUSTER

(71) Applicant: Compressor Products International, LLC, Charlotte, NC (US)

(72) Inventor: Lee Alexander, Missouri City, TX (US)

(73) Assignee: Compressor Products International, LLC, Charlotte, NC (US)

( * ) Notice: Subject to any disclaimer, the term of this patent is extended or adjusted under 35 U.S.C. 154(b) by 0 days.

(21) Appl. No.: 15/335,114

(22) Filed: Oct. 26, 2016

(65) Prior Publication Data

US 2018/0195667 A1 Jul. 12, 2018

Related U.S. Application Data

(63) Continuation of application No. 13/538,979, filed on Jun. 29, 2012, now Pat. No. 9,506,602.

(60) Provisional application No. 61/584,606, filed on Jan. 9, 2012, provisional application No. 61/502,712, filed on Jun. 29, 2011.

(51) Int. Cl.
*F16N 13/04* (2006.01)
*F16N 13/14* (2006.01)

(52) U.S. Cl.
CPC .............. *F16N 13/04* (2013.01); *F16N 13/14* (2013.01)

(58) Field of Classification Search
CPC .................................. F16N 13/04; F16N 13/14
See application file for complete search history.

(56) References Cited

U.S. PATENT DOCUMENTS

| | | | | |
|---|---|---|---|---|
| 4,848,926 A | * | 7/1989 | Jenkins | G01F 1/28 374/142 |
| 2002/0121408 A1 | * | 9/2002 | Youngers | F16N 7/38 184/26 |
| 2004/0112679 A1 | * | 6/2004 | Centers | F04C 18/16 184/7.4 |
| 2006/0054406 A1 | * | 3/2006 | Delaloye | F01D 25/18 184/6.11 |
| 2006/0102133 A1 | * | 5/2006 | Callan | F01M 1/18 123/196 R |
| 2008/0188351 A1 | * | 8/2008 | Schiele | F16H 57/0434 477/98 |
| 2008/0308353 A1 | * | 12/2008 | Aixala | F01M 1/16 184/6.5 |
| 2012/0241258 A1 | * | 9/2012 | Subramaniam | F16N 7/40 184/6.4 |
| 2013/0074628 A1 | * | 3/2013 | Uusitalo | F16H 57/0435 74/467 |

(Continued)

*Primary Examiner* — Michael A Riegelman
(74) *Attorney, Agent, or Firm* — Perkins Coie LLP

(57) ABSTRACT

A lubricator pump adjuster for use with a lubricator pump having a piston housed in a pump body and a rocker connected to the piston. The lubricator pump adjuster comprises a mounting fitting attachable to the pump body and a housing disposed on the mounting fitting. An actuator is disposed in the housing and connectable to the rocker, whereby activation of the actuator causes the rocker to move, thereby adjusting the stroke of the piston. The actuator is a rotary actuator with an output shaft. The lubricator pump adjuster includes a cam faced member attached to the output shaft, and a plunger in contact with the cam faced member that is connectable to the rocker. The cam faced member may include a spiral-ramped surface.

2 Claims, 17 Drawing Sheets

(56) References Cited

U.S. PATENT DOCUMENTS

2015/0345616 A1* 12/2015 Schweiher .......... F16H 57/0409
184/6.12

* cited by examiner

LUBRICATOR PUMP ADJUSTER

CROSS-REFERENCE TO RELATED APPLICATIONS

This application claims the benefit of U.S. Provisional Application No. 61/584,606, filed Jan. 9, 2012, and U.S. Provisional Application No. 61/502,712, filed Jun. 29, 2011, the disclosures of which are hereby incorporated by reference in their entireties.

BACKGROUND

Reciprocating equipment, such as compressors and engines to name a few, have many moving parts and seals. Many of these components require lubrication and/or constant monitoring to ensure proper function and longevity. In addition, the systems responsible for lubricating critical components require monitoring and adjustment to ensure that critical components receive the level of lubrication necessary to help prevent costly failures and equipment downtime.

Divider block lubrication systems wear for a number of reasons. Some of the reasons include extended service in high-pressure applications, contamination of the oil, or incorrect maintenance. Wear of the divider block pistons allows oil to bypass to a lubrication point with less pressure, over lubricating lower pressure points and under lubricating higher pressure points. Accordingly, operators adjust the lubricator pump output at times to compensate. Unfortunately, manual adjustment quite often results in under or over lubrication.

Accordingly, there is a need for a lubricator pump adjuster that can be used to automatically adjust the output of the lubricator pump as needed. There is a further need for a wear detection and lubrication monitoring system that allows system operators to have the ability to detect and fix minor problems with equipment components before they evolve into major failures of the equipment. Furthermore, there is a need for a system that allows operators to monitor the performance of lubricating systems to ensure proper function.

SUMMARY

Provided herein is a lubricator pump adjuster for use with a lubricator pump having a piston housed in a pump body and a rocker connected to the piston. The lubricator pump adjuster comprises a mounting fitting attachable to the pump body and a housing disposed on the mounting fitting. An actuator is disposed in the housing and connectable to the rocker, whereby activation of the actuator causes the rocker to move, thereby adjusting the stroke of the piston. In an embodiment, the actuator is a rotary actuator with an output shaft.

In one aspect of the technology described herein, the lubricator pump adjuster includes a cam faced member attached to the output shaft, and a plunger in contact with the cam faced member that is connectable to the rocker. The cam faced member may include a spiral-ramped surface. In an embodiment, the cam faced member includes a plurality of teeth disposed about its circumference and the adjuster further comprises a latch mechanism operative to engage the teeth.

In another aspect of the technology, the lubricator pump includes a threaded shaft connected to the output shaft and a driver block threaded onto the threaded shaft. The driver block moves a plunger connectable to the rocker when the actuator is activated. The driver block may include a plurality of bearing apertures configured to receive corresponding bearing stanchions such that the driver block is guided in a level orientation. The threaded shaft may be an Acme screw.

Also contemplated herein is a method for automatically adjusting the output of a lubricator pump having a piston housed in a pump body and a rocker connected to the piston. In an embodiment, the method comprises operatively connecting an actuator to the rocker, wherein activation of the actuator causes an adjustment to the stroke of the piston; monitoring an output of the lubricator pump; and activating the actuator in response to changes in the output of the lubricator pump.

In an embodiment, the method may further comprise rotating a cam faced member with the actuator and pushing a plunger disposed between the cam faced member and the rocker. In another embodiment, the method may comprise rotating a threaded shaft with a driver block threaded thereon and pushing a plunger disposed between the driver block and the rocker.

These and other aspects of the technology and its various embodiments will be apparent after consideration of the Detailed Description and Figures herein. It is to be understood, however, that the scope of the invention shall be determined by the claims as issued and not by whether given subject matter addresses any or all issues noted in the background or includes any features or aspects recited in this summary.

BRIEF DESCRIPTION OF THE DRAWINGS

The accompanying drawings, which are incorporated in and constitute a part of this specification, illustrate embodiments of a lubricator pump adjuster and together with the description, serve to explain the principles and operation thereof. Like items in the drawings are generally referred to using the same numerical reference.

FIG. 1A is a side view in cross-section of a lubricator pump as known in the prior art;

FIG. 2A is a side view in partial cross-section of a lubricator pump incorporating a pump adjuster according to a first exemplary embodiment;

FIG. 3A is a perspective view of the pump adjuster shown in FIG. 2A;

FIG. 4A is a perspective view of the pump adjuster shown in FIGS. 2A and 3A with the housing removed for clarity;

FIG. 5A is a side view in cross-section of the pump adjuster shown in FIGS. 2A-4A;

FIG. 6A is a side view in elevation of the actuator assembly shown in FIGS. 4A and 5A;

FIG. 7A is a side view in cross-section of the actuator assembly shown in FIG. 6A;

FIG. 8A is a perspective view of the actuator assembly shown in FIGS. 6A and 7A;

FIG. 9A is a perspective view of a pump adjuster according to a second exemplary embodiment with the housing removed for clarity;

FIG. 10A is a side view in cross-section of the pump adjuster shown in FIG. 9A;

FIG. 11A is a perspective view of the actuator assembly shown in FIGS. 9A and 10A; and FIG. 12A is a side view in cross-section of the actuator assembly shown in FIG. 11A.

DETAILED DESCRIPTION

Figure 1:
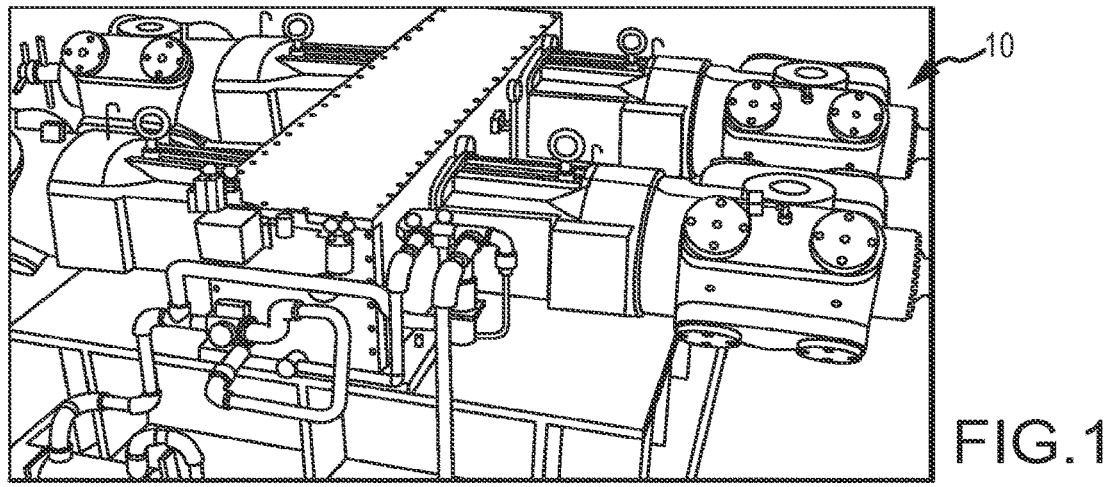
FIG. 1 is a perspective view of a compressor pump unit.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Provided herein is an automatic lubricator pump adjuster that is capable of receiving adjustment commands from a feed back sensor, such as a lubrication rate sensor, or from an electronic controller, and adjusting the output of an associated lubricator pump. Accordingly, the lubricator pump adjuster disclosed herein is useful in providing closed-loop and/or predictive flow rate control of a lubricator pump. Furthermore, the disclosed lubricator pump adjuster may be used in conjunction with the wear detection and lubrication monitoring system described below. The lubricator pump adjuster may also be configured as a stand alone system.

FIG. 1A illustrates a manually adjustable lubricator pump 10A. Lubricator pump 10A includes a pump body 12A mounted to a lubricant reservoir 14A. Pump body 12A houses a piston 22A that is operative to force lubricant through a discharge check valve 26A. Lubricant passing through discharge check valve 26A exits pump 10A at the pump discharge 32A where it is directed to various lubrication points on a machine, such as a compressor. Lubricant is supplied to the piston via the supply inlet shut-off ball valve 24A which is connected to the pump inlet 30A. In this case, the lubricator pump 10A is a pressure fed pump. Accordingly, fluid is supplied under pressure to the pump inlet 30A where it is fed through the inlet shut-off ball valve 24A to piston 22A. While the lubricator pump shown in the various figures is a pressure fed pump, the disclosed pump adjuster works with gravity and suction feed pumps as well as pressure fed lubricator pumps.

Piston 22A is actuated by an engine-driven camshaft 18A. Camshaft 18A is operative to drive piston 22A upwards against spring 20A, thereby compressing the lubricant above the piston 22A forcing the lubricant to be distributed through discharge check valve 26A. The camshaft 18A pushes against piston 22A via rocker 16A. In this case, rocker 16A is a roller rocker, as is known in the art. The amount of lubricant discharged from pump 10A is dependent on the stroke of the piston 22A and the resulting swept volume. The swept volume of the piston 22A may be adjusted by limiting the extent to which piston 22A retracts toward camshaft 18A on the downward stroke of the piston. This is accomplished by limiting how far rocker 16 may rotate about fulcrum 17A with respect to pump body 12A, which in turn, limits the stroke of piston 22A.

The rotation of rocker 16A is limited by a plunger 28A that is adjusted with an adjustment sleeve 34A. Adjustment sleeve 34A is threaded such that, when rotated, it moves inward or outward with respect to housing 12A. Plunger 28A includes a shoulder 38A that interfaces with the bottom of adjustment sleeve 34A. Accordingly, as adjustment sleeve 34A is adjusted up and down, so is plunger 28A. Adjustment sleeve 34A may be locked in a selected position with a jam nut 36A, as known in the art. In order to reduce the amount of lubricant supplied by lubricator pump 10A, adjustment sleeve 34A is screwed inward (clockwise), thereby pushing plunger 28A downward against rocker 16A. Rocker 16A is, in turn, caused to rotate about its fulcrum 17A, thereby pushing piston 22A upward which limits the stroke through which piston 22A travels. In order to increase the amount of lubricant provided, adjustment sleeve 34A is screwed outward (counter-clockwise), thereby allowing the rocker 16A to rotate about its fulcrum 17A such that the piston is allowed to retract to its fullest extent.

Referring to FIG. 2A, it can be appreciated that the adjustment sleeve 34A, jam nut 36A, and plunger 28A are replaced by lubricator pump adjuster 50A. Pump adjuster 50A is attached to pump body 12A by an arrangement of mounting fittings 54A such that the pump adjuster 50A is hard-mounted to the pump body 12A. Extending from pump adjuster 50A is a plunger 52A that interacts with rocker 16A in a similar manner to that described above with respect to plunger 28A in FIG. 1A.

With further reference to FIG. 3A, pump adjuster 50A includes a control module 55A. Control module 55A is housed in housing 56A which is supported on the lubricator pump 10A by fitting arrangement 54A. The control module 55A is operatively connected to a display device 60A that may provide information and display configuration settings for the pump adjuster. Control module 55A is also connected to a plurality of buttons 68A which may be used to configure the pump adjuster. Indicator lights 66A may be included, to provide warning and/or status information. The control module 55A may be equipped with a communication connection, such as a wireless transceiver, a data port, or an USB plug 64A as shown, for connecting to a computer which may be used to configure the pump adjuster and/or upload and download data. In this case, the control module 55A includes a wireless module 57A (see FIG. 4A), such as the Smart Mesh IA510 available from Dust Networks. Wireless module 57A includes an antenna connection 62A. A multi-pin connector 58A is provided to connect feedback sensors and/or power to the pump adjuster 50A. While shown locally mounted, control module 55A could be remotely located as well, for example, at a control panel or the like. Furthermore, a single master electronic control device could operate a plurality of adjuster actuators.

Referring now to FIGS. 4A and 5A, actuator assembly 70A is housed inside housing 56A and is supported therein by mounting plates 82A and 84A. Mounting plates 82A and 84A are spaced apart by a plurality of stanchions 86A. The actuator assembly 70A includes an actuator 72A connected to a cam faced member. In this case, the cam faced member is in the form of a spiral-faced gear 74A. In this case, actuator 72A is an electric motor having an output shaft, such as a stepper motor. Spiral-faced gear 74A interacts with intermediate plunger 76A that is, in turn, operatively connected to plunger 52A. Control module 55A is operatively connected to actuator 72A to control the rotation of spiral-faced gear 74A, and thereby operative to control the output of lubricator pump 10A. In this case, the actuator is provided with a manual adjustment knob 100A which may be accessed by removing access plug 102A.

As shown in FIGS. 6A and 7A, the spiral-faced gear 74A is disposed about a central shaft portion 94A which is supported on one end by mounting plate 84A in a bushing 98A. Spiral-faced gear 74A includes a spiral-ramped surface 92A (i.e. corkscrew surface) that extends around the central shaft portion 94A. In this case, spiral-faced gear 74A is configured such that when rotated in a clockwise direction, spiral-ramped surface 92A urges intermediate plunger 76A downward (see FIG. 6A). Accordingly, as motor 72A turns spiral-faced gear 74A in a clockwise direction (as viewed from above), intermediate plunger 76A is urged in a downward direction, thereby reducing the lubricator pump output. In an alternative construction, the cam faced member may be comprised of a cylinder having an angled axially-facing end surface, rather than the spiral-ramped surface 92A.

Intermediate shaft 76A and plunger 52A are connected by a threaded arrangement and are spring-biased in a downward direction by spring 78A and spring retainer 80A. With reference to FIG. 5A, it can be appreciated that spring retainer 80A is captured between intermediate plunger 76A and plunger 52A. It also can be appreciated that spring 78A is disposed between lower mounting plate 84A and spring retainer 80A. Accordingly, the spring 78A urges the plungers 76A and 52A in a downward direction towards rocker 16A. As best shown in FIG. 7A, intermediate plunger 76A includes female threads 104A for mating with corresponding male threads formed on plunger 52A.

Actuator assembly 70A includes a latch mechanism 90A which prevents spiral-faced gear 74A from being back-driven in the opposite direction (counter-clockwise). With reference to FIGS. 7A and 8A, latch 90A includes a pawl 106A having teeth that engage a plurality of mating teeth 96A. Mating teeth 96A are axially-extending teeth disposed about the circumference of the spiral-faced gear 74A.

Figure 9:
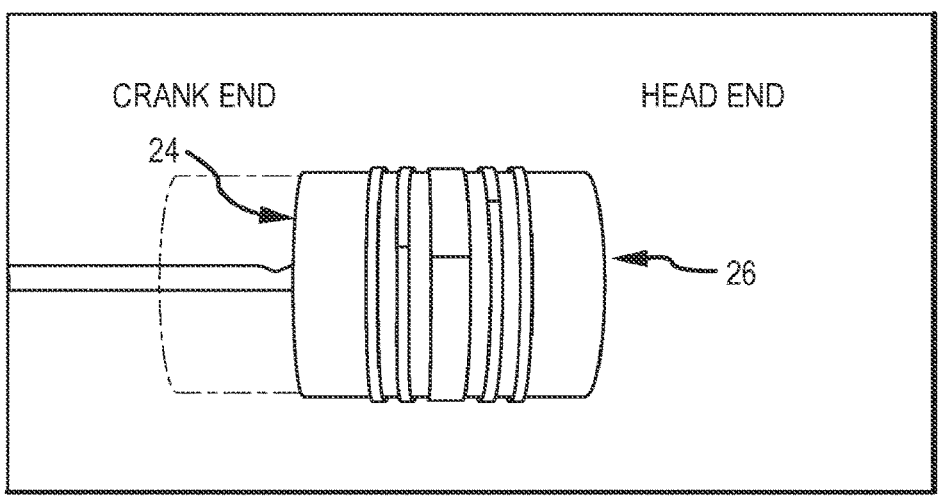
FIG. 9 is a perspective view of the compressor piston illustrating the crank end and head end of the cylinder.
Figure 10:
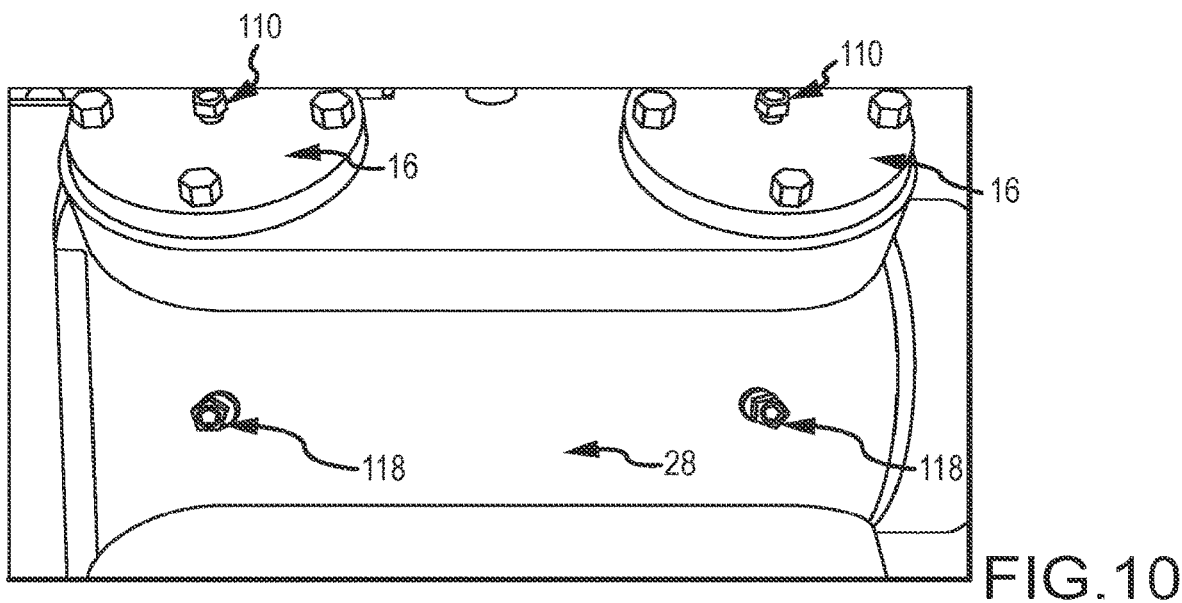
FIG. 10 is a perspective view of the compressor cylinder showing the cylinder pressure sensors.
Figure 11:
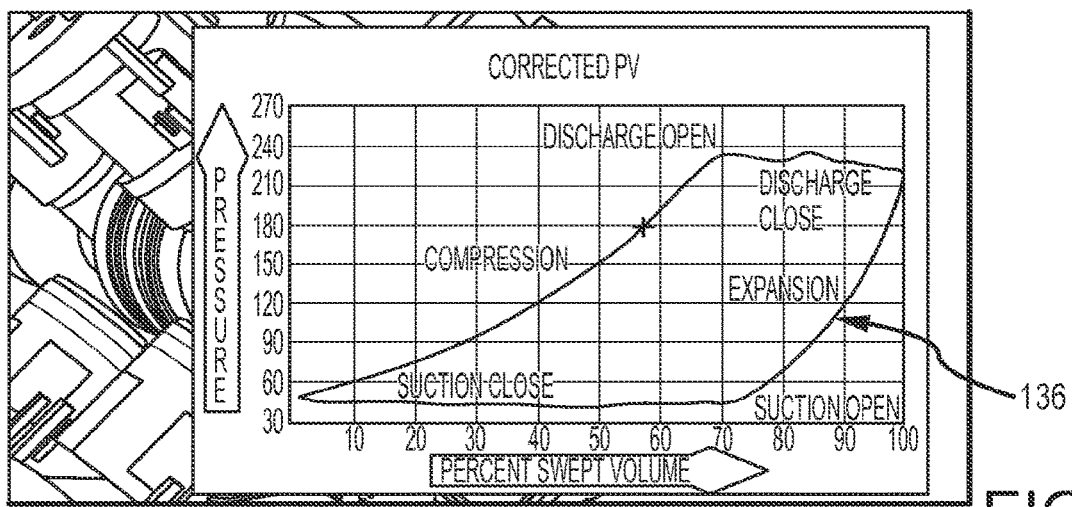
FIG. 11 is a PV curve illustrating normal compressor operation.
Figure 12:
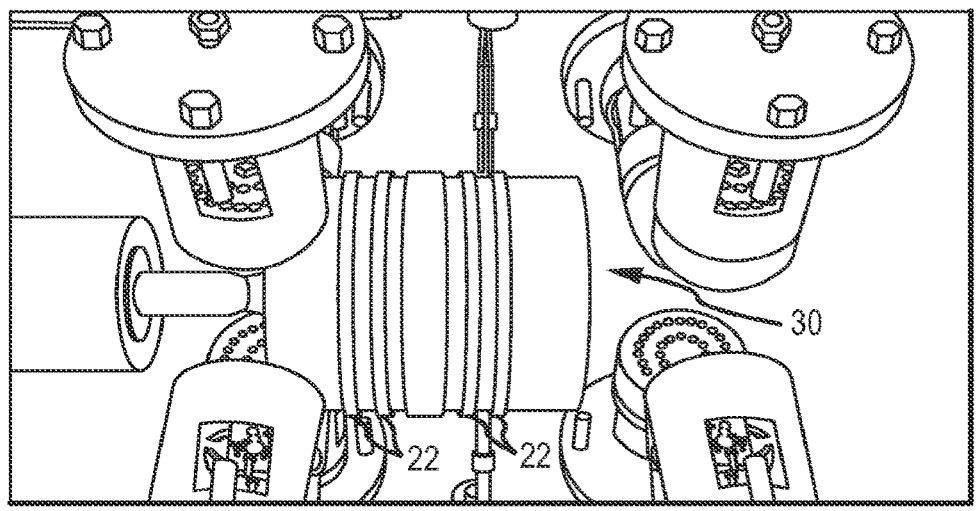
FIG. 12 is a perspective view of the compressor piston illustrating leaking piston rings.

FIGS. 9A-12A illustrate a pump adjuster 250A according to a second exemplary embodiment. Pump adjuster 250A is similar to pump adjuster 50A described above; however, in this embodiment, the actuator assembly 270A operates under a different principle. Pump adjuster 250A includes a controller 55A and an actuator assembly 270A. With reference to FIGS. 9A and 10A, actuator assembly 270A includes an actuator 272A which is mounted on a motor mounting plate 282A. A second mounting plate 284A is spaced from motor mounting plate 282A by a plurality of bearing stanchions 286A. In this embodiment, motor 272A rotates a threaded screw, such as Acme screw 294 which is threaded to driver block 274A at threads 296A, as shown in FIG. 12A.

Block 274A includes a plurality of bearing apertures 292A that receive bearing stanchions 286A. Accordingly, driver block 274A is guided between mounting plates 282A, 284A in a level orientation by bearing stanchions 286A. Driver block 274A includes a pocket 206A that receives an end portion of intermediate plunger 276A. Intermediate plunger 276A is threadably attached to plunger 252A with threads 204A. With reference to FIG. 10A, a spring retainer 280A is captured between intermediate plunger 276A and plunger 252A. Also, spring 278A is disposed between spring retainer 280A and mounting plate 284A. Accordingly, the plunger 252A is urged in a downward direction towards rocker 16A.

In this case then, it can be appreciated that as motor 272A rotates, the Acme screw is operative to move driver block 274A either upward or downward depending on the direction of rotation in motor 272A. For instance, if the motor rotates clockwise, the driver block 274A is driven downward, thereby pushing intermediate shaft 276A in a downward direction.

Although the pump adjusters of the various embodiments have been described in terms of electric motor actuators, it should be appreciated that hydraulic, magnetic, or pneumatic actuators may be employed. Furthermore, not only may rotary actuators be used, linear actuators may be used as well. Also, while the intermediate shaft and plunger are shown as separate components, which facilitates retrofitting existing lubricator pumps, in certain cases the intermediate shaft and plunger may be integrated into a single elongated member.

Methods relating to the above described lubricator pump adjuster are also contemplated. The methods thus encompass the steps inherent in the above described structures and operation thereof. In an exemplary embodiment, the method may comprise operatively connecting an actuator to the rocker, wherein activation of the actuator causes an adjustment to the stroke of the piston; monitoring an output of the lubricator pump; and activating the actuator in response to changes in the output of the lubricator pump. In an embodiment, the method may further comprise rotating a cam faced member with the actuator and pushing a plunger disposed between the cam faced member and the rocker. In another embodiment, the method may comprise rotating a threaded shaft with a driver block threaded thereon and pushing a plunger disposed between the driver block and the rocker.

Described herein is a system 100 for monitoring wear components and delivering correct lubrication levels to protect reciprocating equipment, such as compressors 10 shown in FIG. 1. Wireless sensor technology combined with the system software reduces reciprocating compressor wear, extends product life, and reduces lubrication waste. With this system, operators have the ability to detect and fix minor problems before they evolve into major failures of the compressor. The system may be modular to allow the system to be expanded from a basic system to meet growing or changing requirements as necessary.

Figure 2:
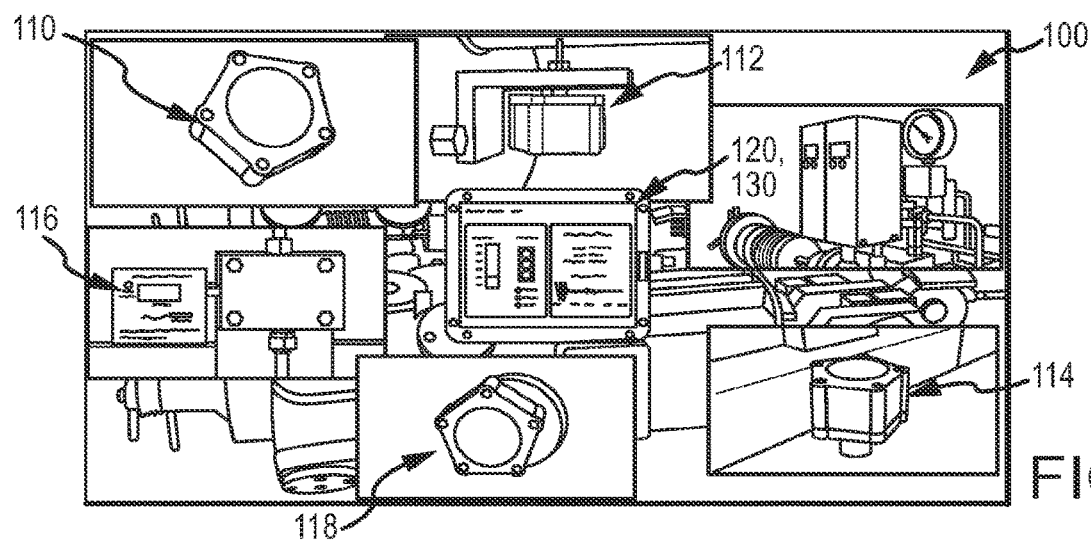
FIG. 2 illustrates the components of a wear detection and lubrication monitoring system according to an exemplary embodiment.

System 100 detects premature wear or failure of compressor valves, piston rings, rider bands, packing glands, and all high-pressure lubrication components. With reference to FIG. 2, this is accomplished through a network of wireless sensors 110-118, a wireless receiver/monitor 120, and a software package 130 that is located locally or remotely and operating on a processor 131 that may be associated with the receiver/monitor 120 or a separate computing device, such as, for example, a server, a desktop computer, a laptop computer, a chip-set, a field programmable gate array (FPGA), a mobile or handheld processor, a smartphone, or the like. Through real-time or near real-time monitoring of baseline conditions, wear and failures may be detected early.

While only a single wireless receiver/monitor 120 is shown, it is understood that the system may provide the data to a variety of stations and monitors both locally and remotely. Additionally, while shown as a wireless communication system, sensors 110-118 may be wired to receiver/monitor 120, although providing a wireless system allows for retrofitting existing equipment with the technology of the present application. Many of the fault conditions may be resolved before they become costly problems or catastrophic failures.

Figure 3:
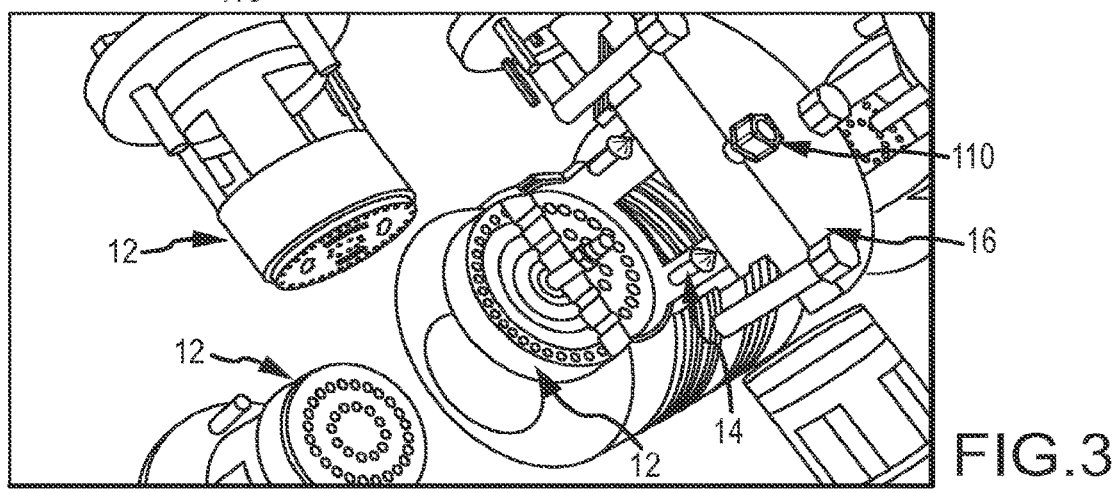
FIG. 3 is a cut away perspective view of a compressor valve.

Compressor valves are a component that is subject to failure in compressor systems. Reciprocating compressor valves open and close at rates as high as 1800 cycles per minute, or 30 times a second. With reference to FIG. 3, each individual valve 12 creates its own high frequency vibration or acoustic emission signal 14 as it opens and closes. This acoustic emission signal 14 travels through to the external valve cover 16 and is picked up by a valve alert sensor 110, which also may monitor the operational temperature of the valve cover 16. The valve alert sensor 110 may be a vibration sensor, such as a piezoelectric sensor, or a sound sensor such as a microphone, and may include a temperature sensor, such as a thermocouple. Vibration and/or acoustic emission signatures are generally referred to as an acoustic signal and/or used interchangeably herein.

Figure 4:
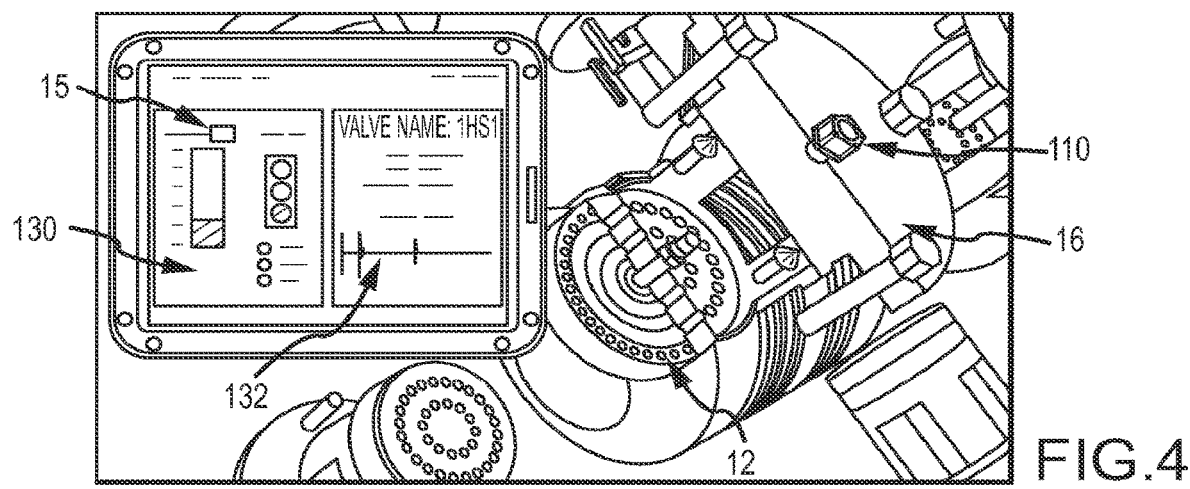
FIG. 4 is a plan view of the system receiver/monitor showing the valve monitoring display of a normally operating valve.

With reference to FIG. 4, software 130 operating on a processor 131, which may be a chip set, a FPGA, mobile computing device, or the like, records in a memory the acoustic signal 14 and the temperature 15 of the valve 12 while it is known to be operating correctly. These measurements establish a baseline recording 132. During operation of the system, software package 130 obtains real-time or near real-time measurements associated with the acoustic and temperature values of the equipment, which in this case is a valve, from the valve alert sensor 110. The operating acoustic signals and temperatures are processed by processor 131 and a comparator in processor 131, which may be a module of software package 130, comparing the operating readings to the baseline. Deviations of a predetermined amount would be determined to be a detected fault, which may be related to valve wear, fracture, or the like. Based on the detected fault, the system would send an alert to an operator and/or, in certain situations, shutdown the equipment.

Figure 5:
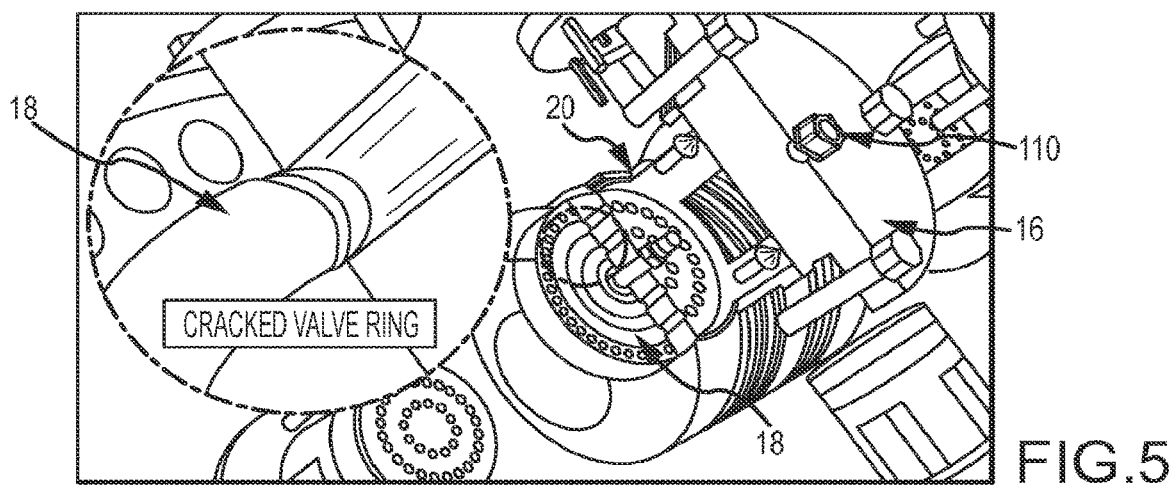
FIG. 5 is a cut away perspective view of a compressor valve that has a cracked valve ring.
Figure 6:
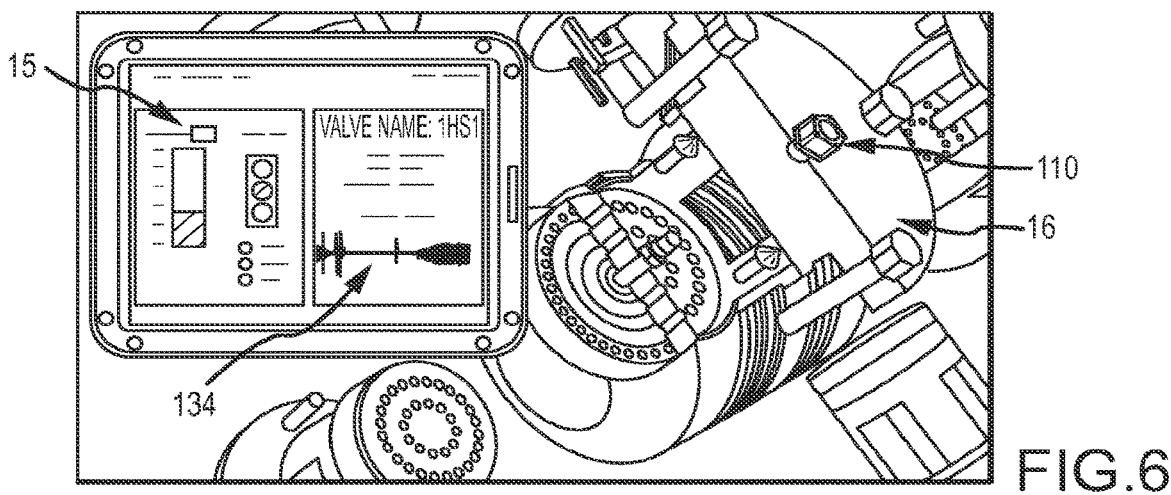
FIG. 6 is a plan view of the system receiver/monitor showing the valve monitoring software display of an abnormally operating valve.

If a valve-sealing element, such as ring 18, fractures or begins to deteriorate, as shown in FIG. 5, the acoustic signature 14 may change and the valve cover temperature may elevate as hot discharge gasses 20 pass back through the valve. In FIG. 6, the sensor 110 senses the temperature 15 and acoustic signal 134. The sensed information is provided to processor 131 which processes the information using software package 130. The deviation in the acoustic signal and or the elevation in temperature may be processed to provide a fault indication that causes an alert to be provided and, in certain situations, the equipment may be shut down. The processor transmits an alert to the operator of an issue with a specific valve.

Figure 7:
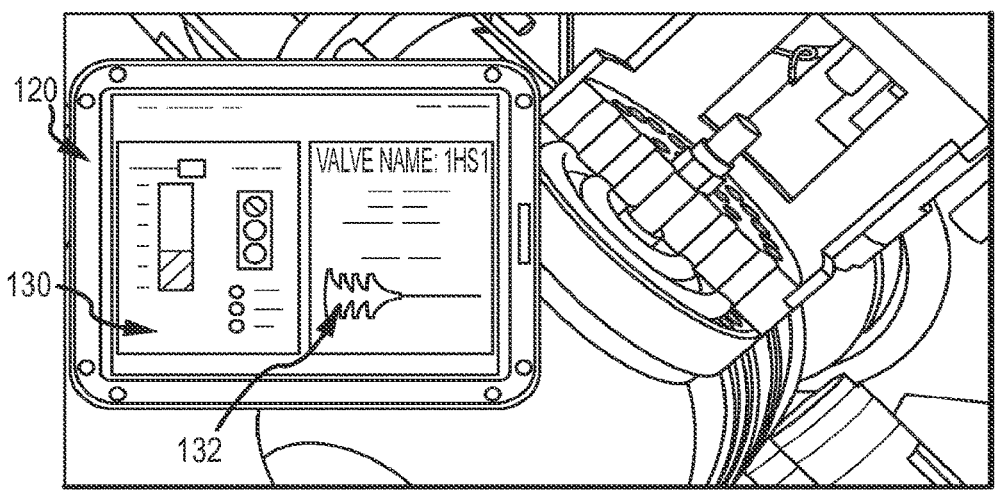
FIG. 7 is a plan view of the system receiver/monitor showing the valve monitoring software display of a fluttering valve.

Valve flutter is identified when the valve opens and closes multiple times within a single cycle of the piston. This decreases overall efficiency, increases stress on the sealing elements and causes valve springs to fail. With reference to FIG. 7, the acoustic signal 132 is sensed by the sensor 110 and sent to a receiver 120. A processor 131 associated with the receiver 120 processes the sensed acoustic signal and may use a comparator to compare the acoustic signal 132 of the operating equipment to previously established baseline. Deviations above a predetermined amount will be determined to be a fault, such as, for example, the fluttering of the valve. The software package 130, which may be operating on processor 131, may record the signature and alert the operator. In certain situations, the equipment may be shut down.

Figure 8:
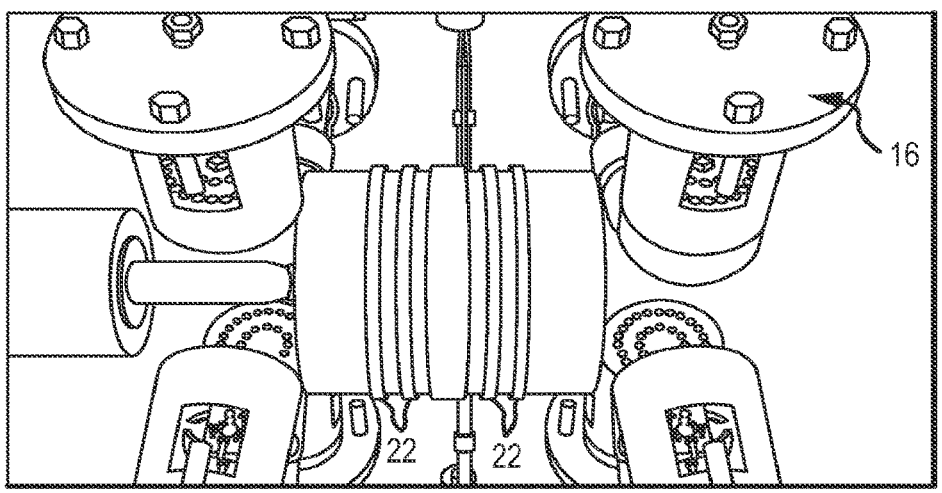
FIG. 8 is a perspective view of the compressor piston with the cylinder hidden.

Turning to FIGS. 8 and 9, when evaluating piston ring wear, it is common practice to measure the dynamic pressure in the crank and head ends of the cylinder, 24 and 26 respectively, using pressure sensors or differential pressure sensors. These measurements enable operators to recognize problems with piston rings 22 or faulty valves 12, and evaluate the overall efficiency of the compressor 10. Pressure-testing valves installed on the crank and head cylinder 28 allow for the mounting of pressure sensors 118, which transmit the pressure readings to the receiver and processor 131 such that the software package 130 can analyze the information.

Figure 13:
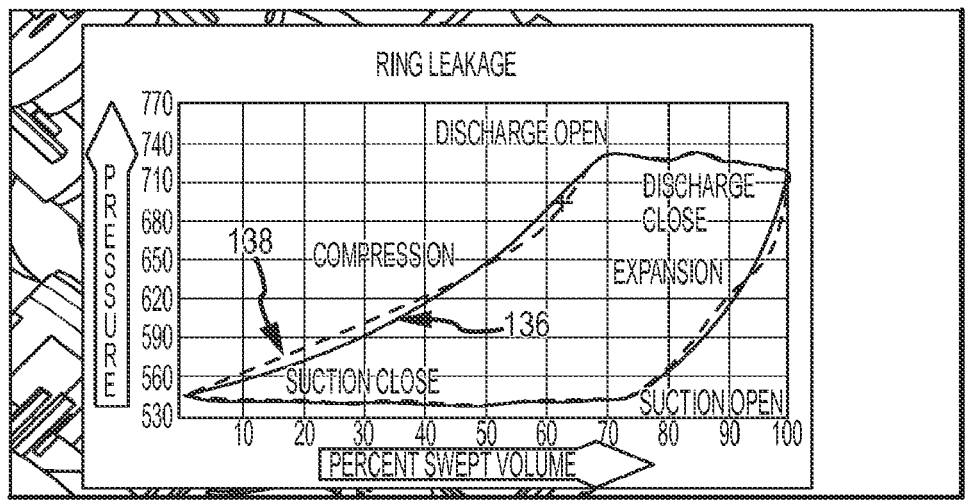
FIG. 13 is a PV curve illustrating a compressor with leaking piston rings.

FIG. 11 shows a pressure volume curve, more commonly referred to as a PV curve. The PV curve is a graphical representation of the gas pressure in the cylinder throughout the piston cycle. The correct operation of a compressor is captured and is set as a baseline condition, as shown in graphic 136 in FIG. 11. When the piston rings 22 wear, they will lose their ability to seal efficiently allowing gas 30 to bypass the rings 22, causing a loss in the compressor's efficiency. This loss will show up as a characteristic change in the PV curve as shown in FIG. 13. The graphic 138 highlights these changes compared to the baseline graphic 136. The pressure rises faster than normal at first, then slower than normal during the compression event. During the expansion event, the pressure drops faster than normal at first, then slower than normal. Software package 130 operating on processor 131 would use a comparator to determine the change in the PV curve and provide an alert to an operator, or in certain situations, shut down the equipment. In this particular example, the processor 131 may record the rate of change of the PV curve, using a first derivative, to determine a fault condition if the rate of change is sufficiently faster than normal and/or sufficiently slower than normal. In other embodiments, instantaneous values may be compared to establish fault conditions.

Figure 14:
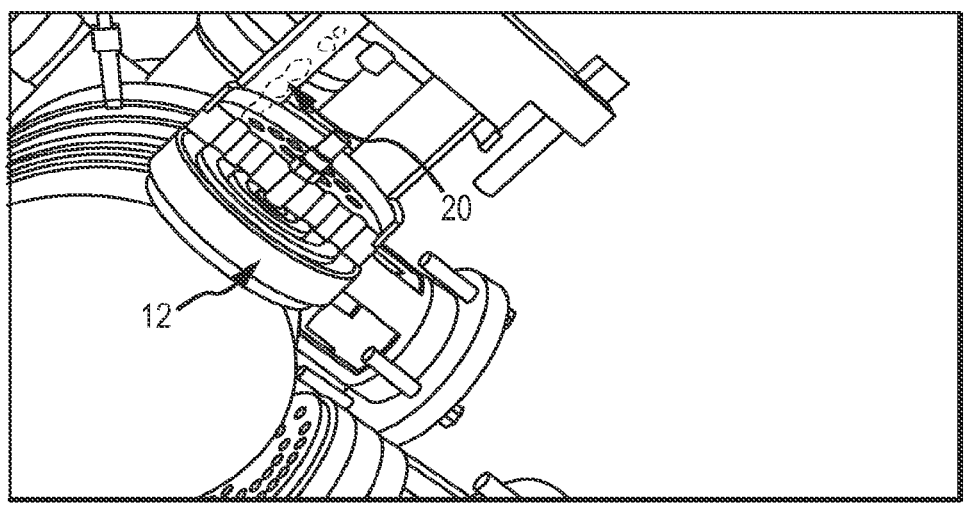
FIG. 14 is a cut away perspective view of a leaking compressor valve.
Figure 15:
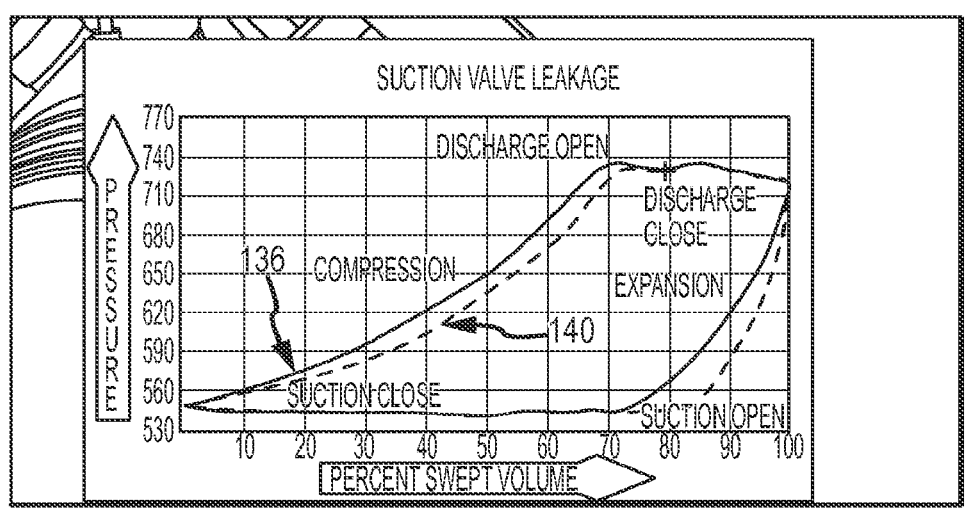
FIG. 15 is a PV curve illustrating a compressor with a leaking valve.
Figure 16:
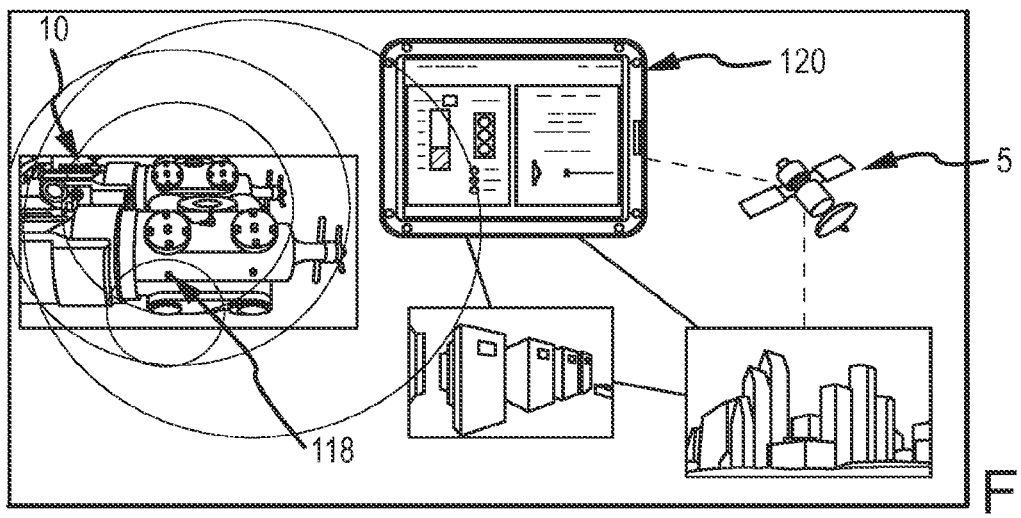
FIG. 16 is a diagram representative of the system communication options.

Turning to FIG. 14, leakage 20 past valve 12 causes a different, but still a fault, characteristic in the PV curve. As shown in FIG. 15, this characteristic is highlighted in graphic 140. The pressure rises slower than normal during the compression event. During the expansion event, the pressure drops faster than normal. This is detected by the pressure sensors and registered by a comparator for operating in software module 130. The comparison may be based on the rate of change using a first derivative as explained above or, alternatively, instantaneous values may be compared. As with all the system sensors, data from the pressure sensors 118 is sent wirelessly to the receiver for relay to any location, locally or through a satellite or internet connection, as represented in FIG. 16. However, as explained above, wired connections may be used instead of a wireless system; although the wireless communication allows for retrofitting legacy systems.

Figure 17:
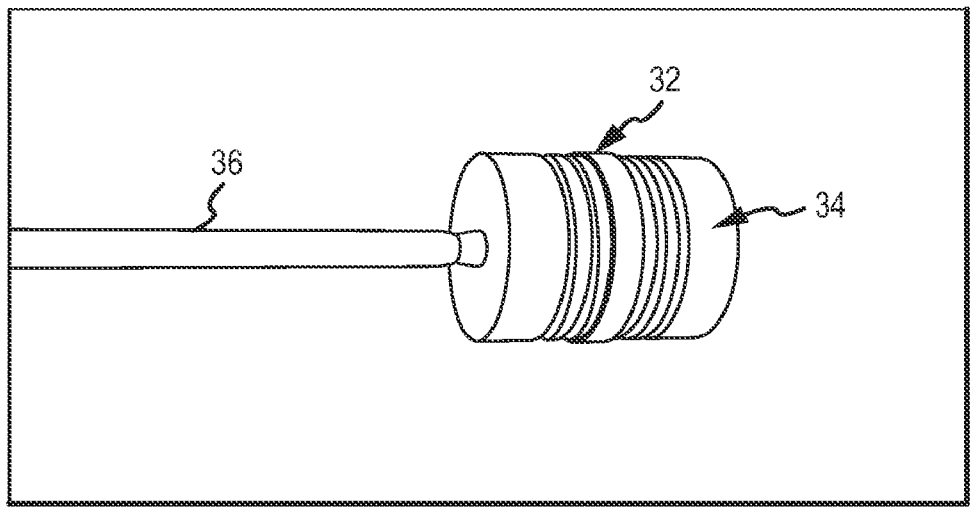
FIG. 17 is a perspective view of the compressor piston, piston rod, and the piston rider bands.
Figure 18:
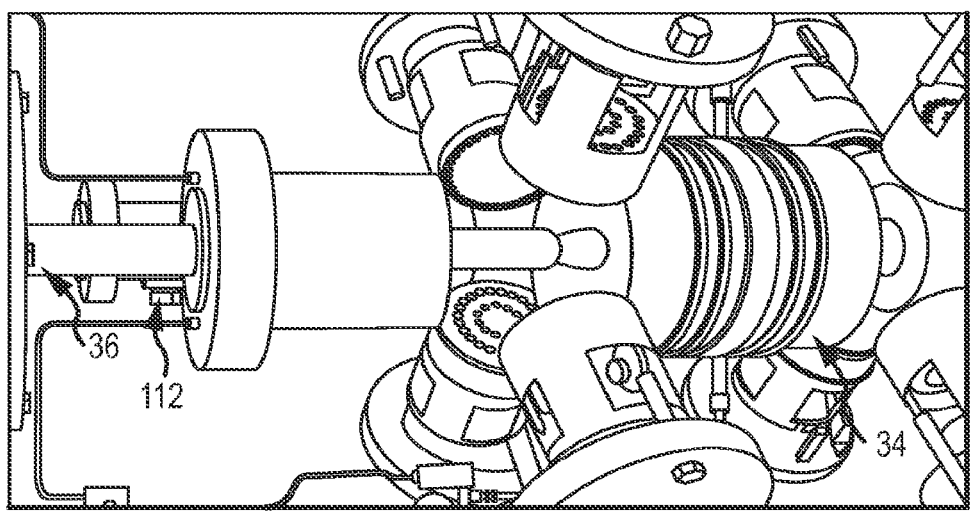
FIG. 18 is a perspective view of the compressor illustrating the location of the rod drop sensor.
Figure 19:
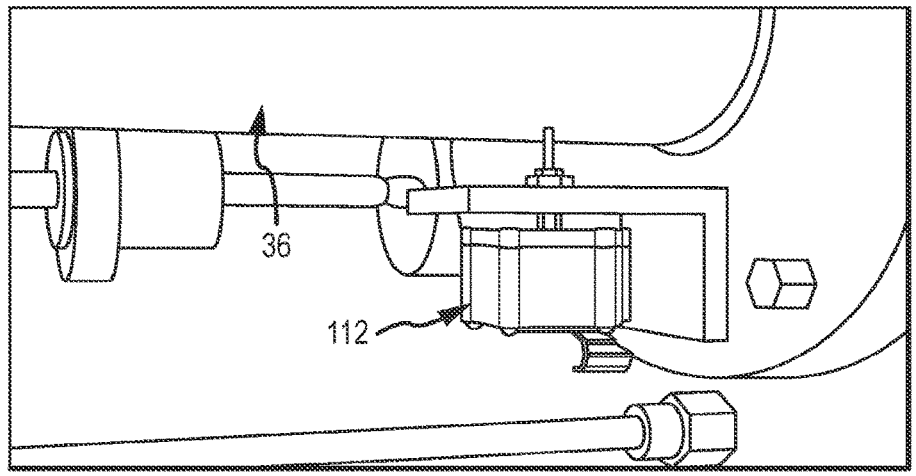
FIG. 19 is an enlarged perspective view of the piston rod drop sensor installed on the cylinder head.
Figure 20:
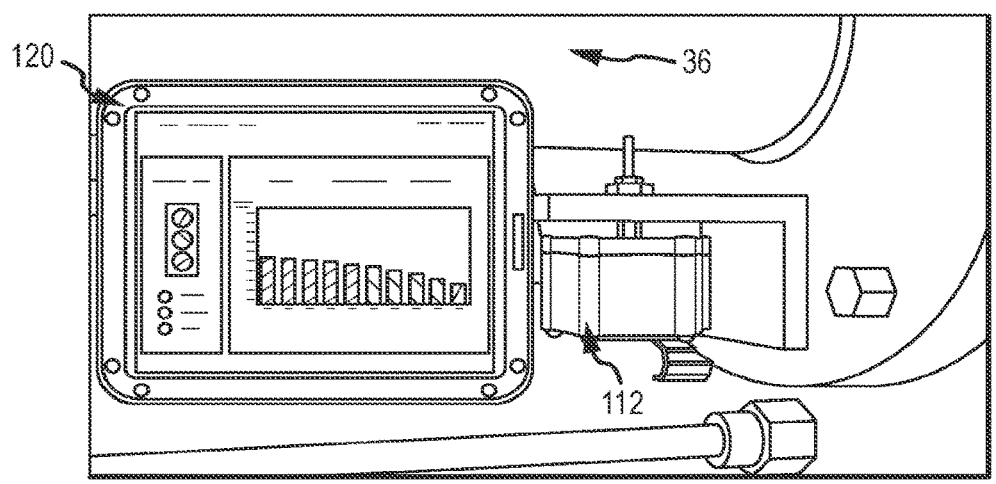
FIG. 20 is a plan view of the system monitor software display showing rod drop measurements.

Piston rider bands 32, shown in FIG. 17, are designed to support the weight of the piston 34 and keep it from making contact with the cylinder liner. With reference to FIGS. 18-20, as the rider band 32 wears, the piston 34 slowly drops and is measured as a drop in the piston rod's 36 position. A rod drop sensor 112 monitors the drop of the piston 34 and if the rod drop exceeds a specified point, as measured from the initial baseline condition, the monitor 120 will send an alarm notifying the operator of the problem. Rod drop sensor 112 may be, for example, a linear variable differential transducer (LVDT), other displacement sensor, or a pressure sensor to detect weight changes with a rod end that confronts the bottom surface of the piston rod 36. As shown in the figure, the rod drop sensor 112 may be mounted to the cylinder head with a bracket or other suitable arrangement. The processor 131 may determine when a rod drops more than a defined amount and alert an operator.

Figure 21:
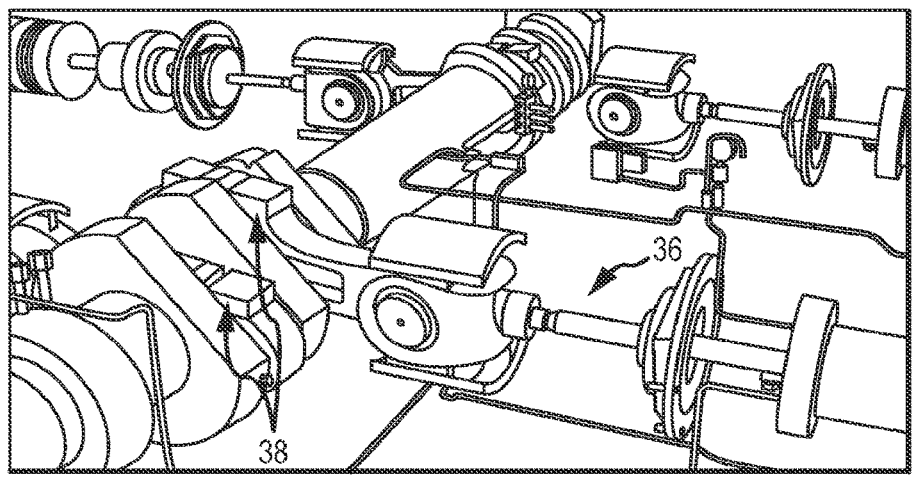
FIG. 21 is a partially hidden perspective view of the compressor crankshaft.
Figure 22:
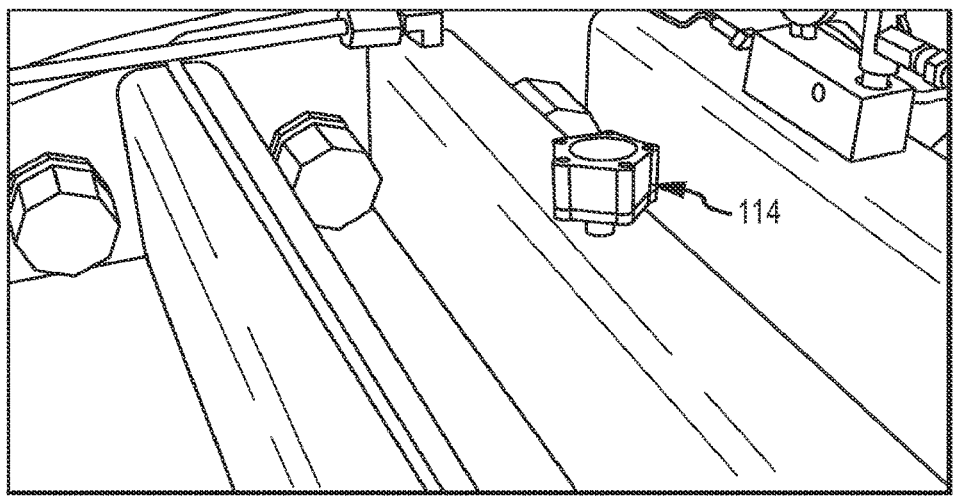
FIG. 22 is a perspective view of the cylinder illustrating the location of the crankshaft bearing sensor.
Figure 23:
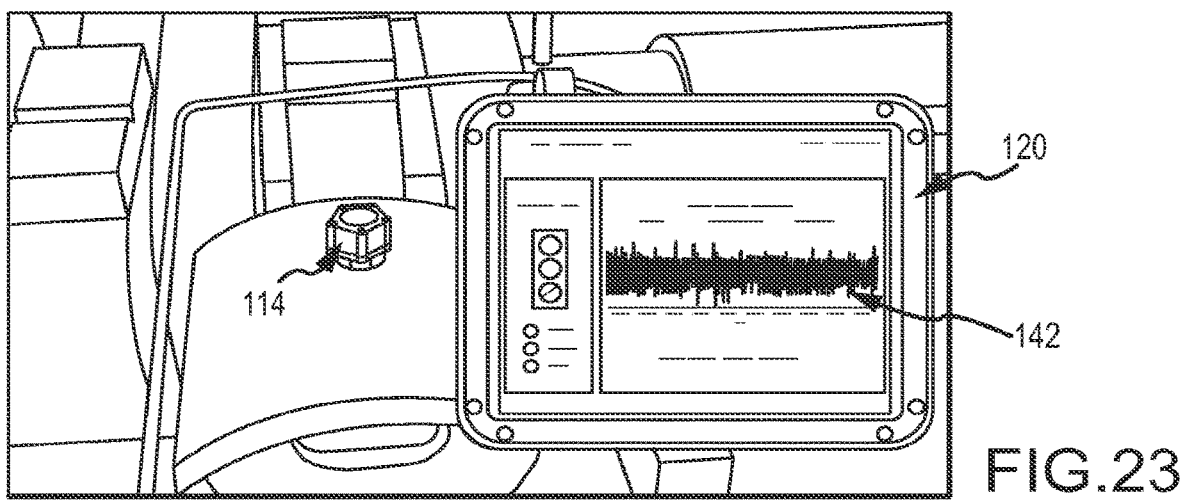
FIG. 23 is a plan view of the system monitor software display illustrating normal bearing operation.
Figure 24:
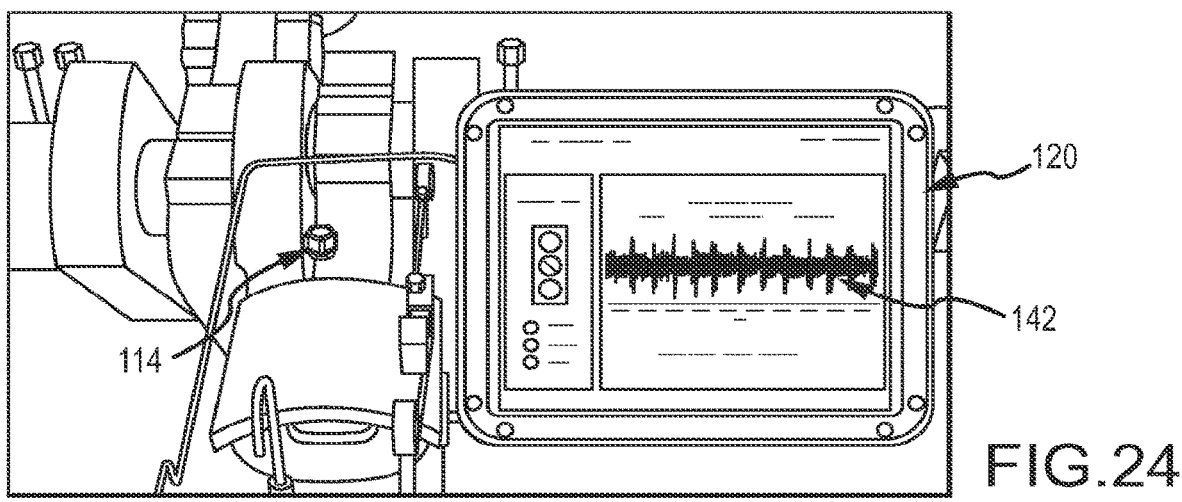
FIG. 24 is a plan view of the system monitor software display illustrating a change from normal bearing operation.

Turning to FIG. 21, crankshaft bearings 38 also create a unique vibration or acoustic signature. The crank bearing sensor 114, shown in FIG. 22, which may be a piezoelectric sensor, a microphone, or the like as described earlier, monitors the vibration signal and relays it to the receiver 120, which may include processor 131 running software package 130 and a monitor or display. As shown in FIGS. 23 and 24, changes in the crankshaft bearing acoustic signal 142 beyond a predetermined variation may trigger alarm conditions in the system software 130. By identifying these changes early, preventative maintenance can be scheduled and catastrophic failure may be avoided.

System 100 also monitors the quantity of oil injected into each individual lubrication point of the compressor cylinders and rod packing. Under-lubrication is the leading cause of premature wear or failure of rod packing 40, piston rings 22, and rider bands 32. However, excessive lubrication equates to hundreds of thousands of dollars in lost revenue for compressor operators worldwide.

Figure 25:
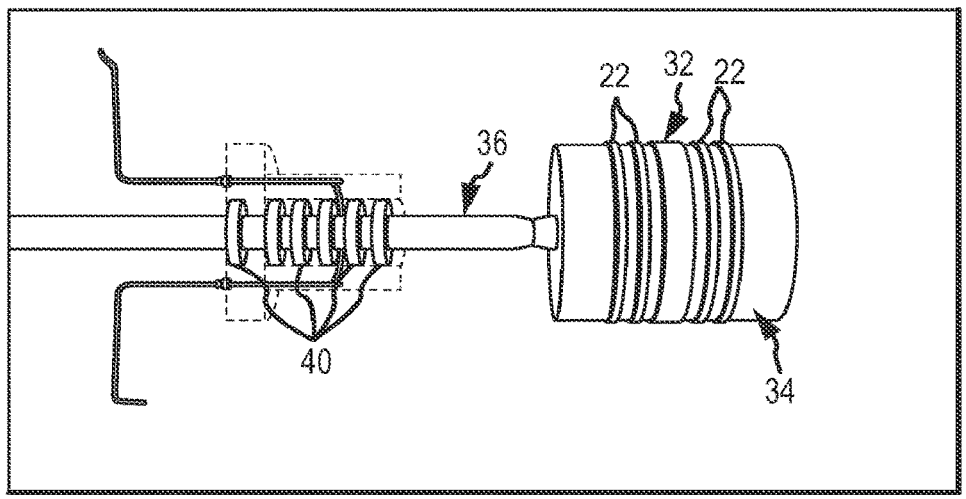
FIG. 25 is a partially hidden side view in elevation of the piston rod packing and a portion of its associated lubrication circuit.
Figure 26:
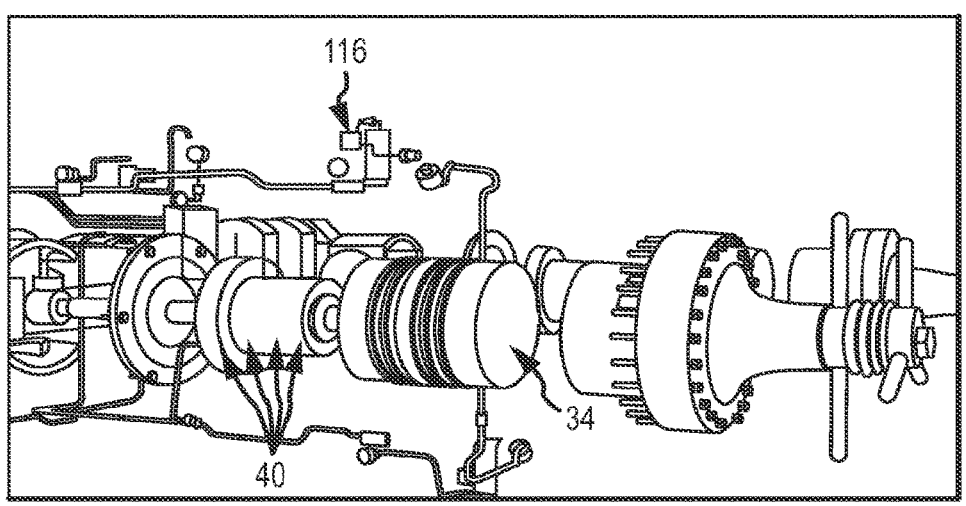
FIG. 26 is a partially hidden perspective view of the compressor and lubrication system illustrating the location of one of the lubrication rate sensors.
Figure 27:
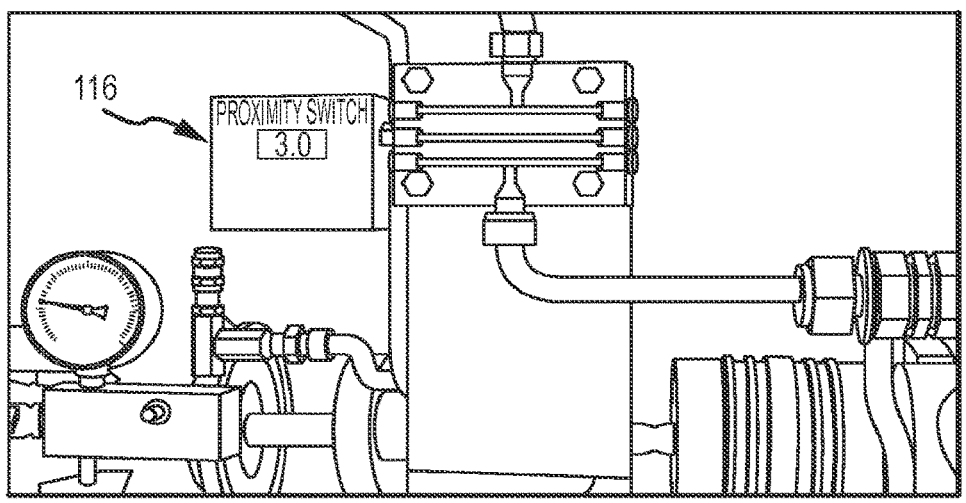
FIG. 27 is an enlarged perspective view of the lubrication rate sensor.
Figure 28:
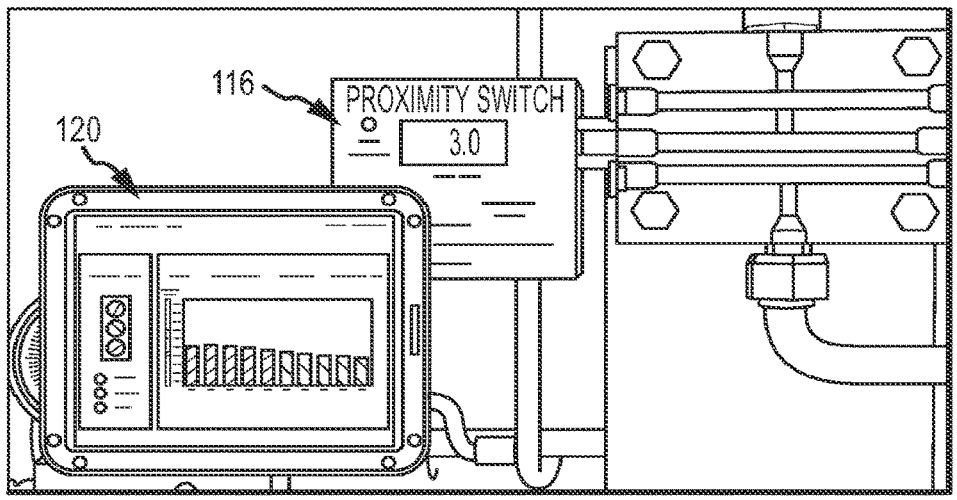
FIG. 28 is a plan view of the system monitor software display indicating a minor reduction in lube rate.
Figure 29:
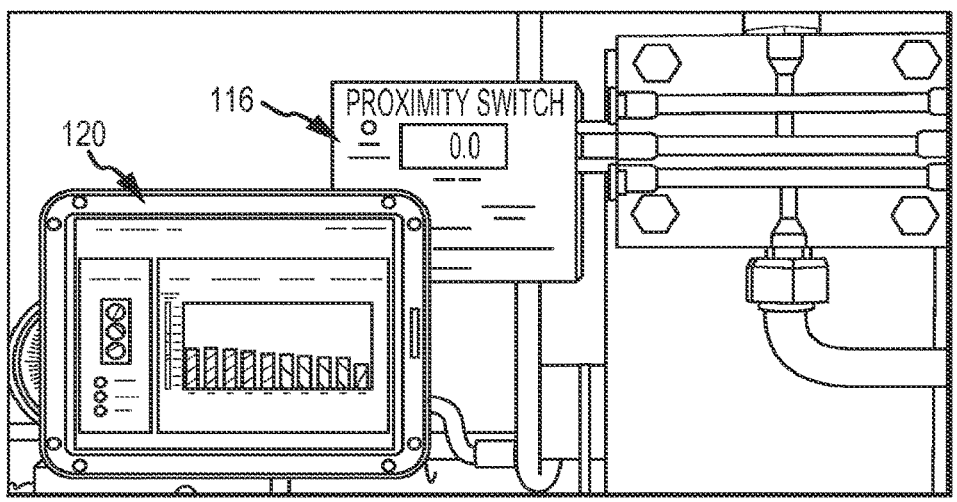
FIG. 29 is a plan view of the system monitor software display indicating a failure in lubrication delivery.

Lubrication rate sensors 116, such as venturi based pressure differential rate sensors, mounted at injection points, such as injection points for rod packing 40 shown in FIGS. 25-27, monitor the exact quantity of oil injected. Changes in lubrication rates over or under predetermined rates may trigger alarm conditions, with yellow alarms, shown in FIG. 28, indicating a minor reduction in lube rate and red alarms, shown in FIG. 29, indicating failures. Of course, other visual or auditory indicia are possible. Because each injection point may be monitored, each device may be flagged for individual fault indications.

Figure 30:
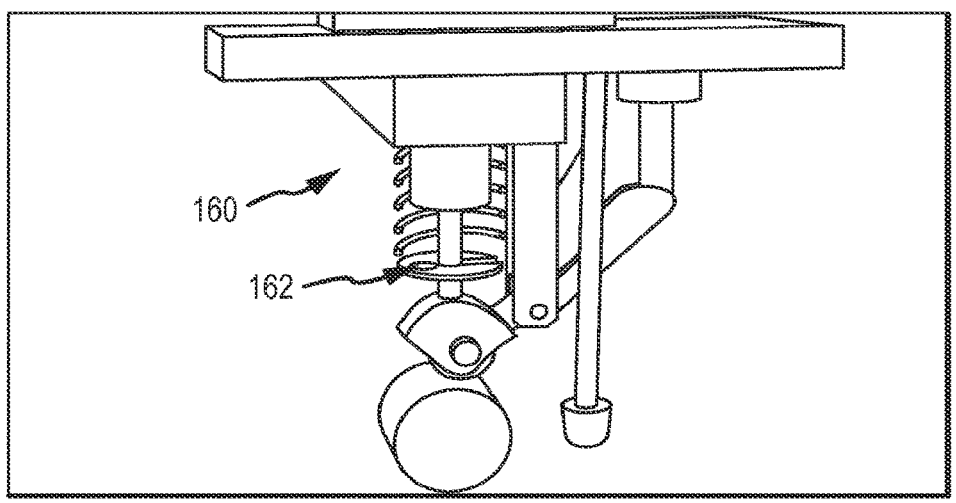
FIG. 30 is a partially hidden perspective view of a portion of a representative lubricator pump.
Figure 31:
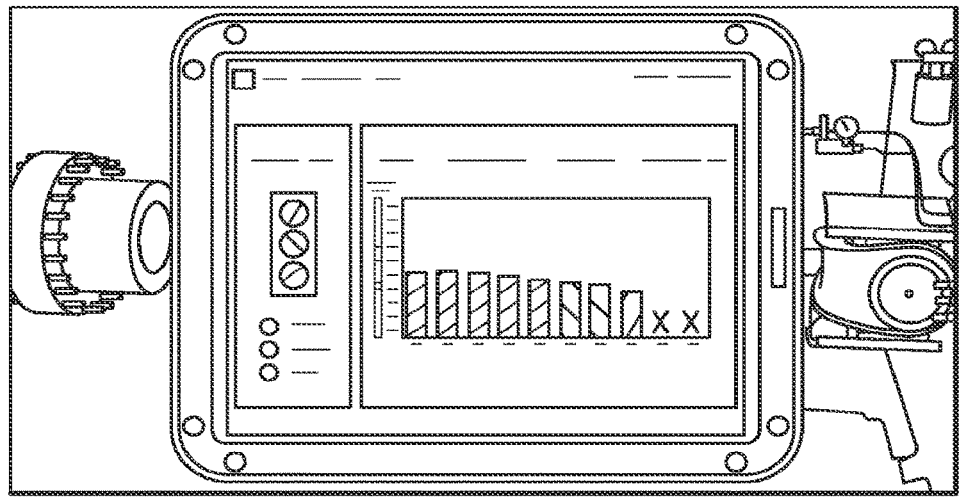
FIG. 31 is a plan view of the system monitor software display indicating a degradation of the lubrication pump output.

As shown in FIG. 30, lubricator pumps 160 in 'pump-to-point' systems begin to deteriorate from extended use in high-pressure environments and from contaminants in the oil. When the piston begins to wear, tolerances are lost and oil 162 bypasses back into the reservoir and the resulting reduction in lubrication to the injection point is difficult to measure. As a result, the cylinder rings and rod packings begin to fail. This problem is reduced through the use of lubrication rate sensors 116. As shown in FIG. 31, when a pump output begins to degrade, as indicated by a reduction of the lubrication flow detected by sensor 116, the data is relayed to the system processor 131 running software package 130 via, for example, a receiver 120 and the specific pump is identified as a problem. If the compressor 10 is unattended, the monitoring system 100 identifies the lubrication point that is not receiving correct lubrication and may immediately shut down the compressor 10 or alert an operator to attend to the issue.

Figure 32:
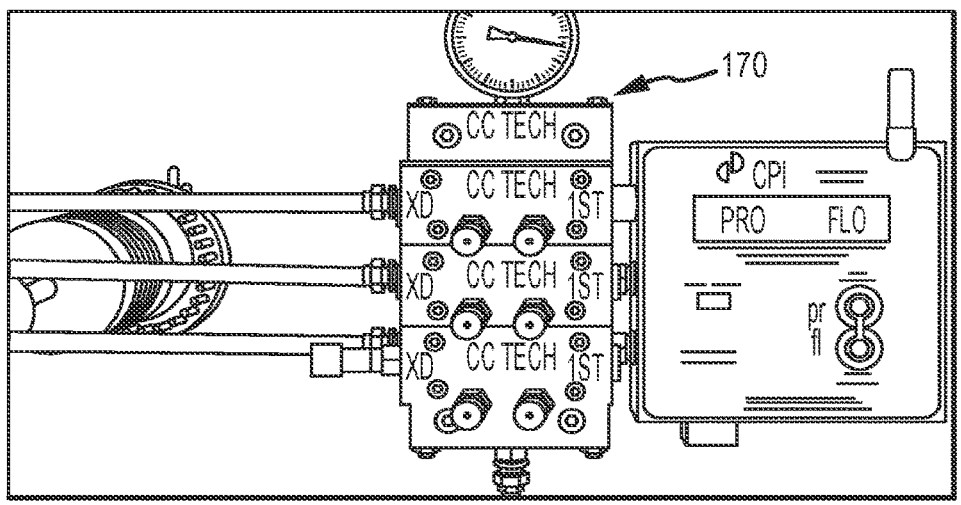
FIG. 32 is a perspective view of a lubrication system divider block.
Figure 33:
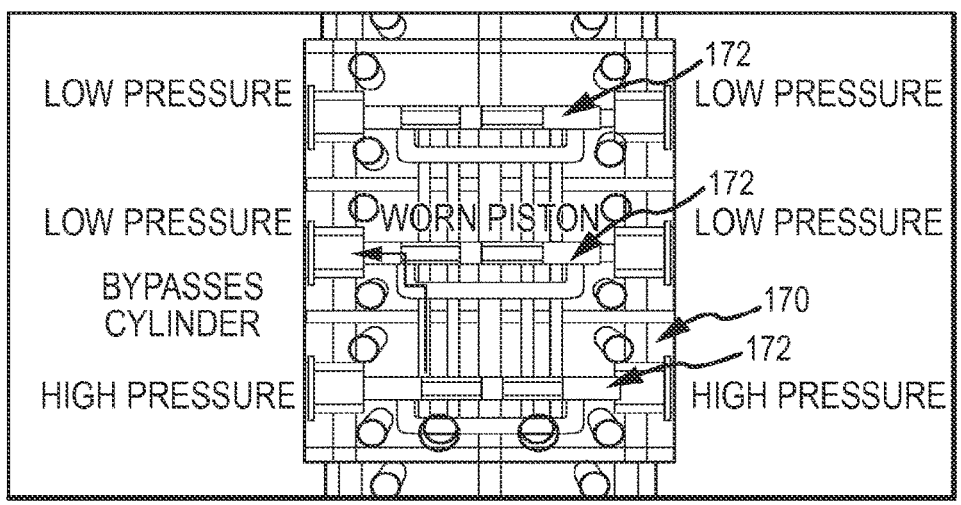
FIG. 33 is a perspective view of a lubrication system divider block illustrating divider block piston leakage.
Figure 34:
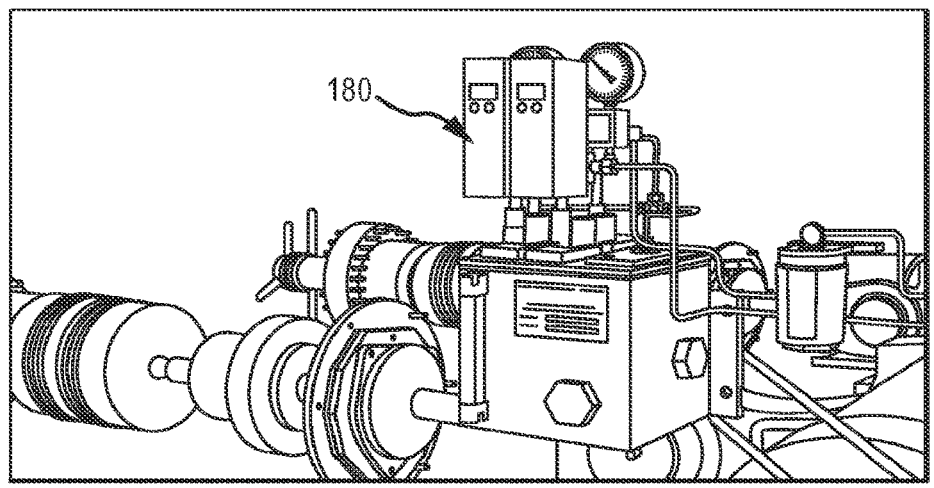
FIG. 34 is a perspective view of a pair of automated pump adjusters.
Figure 35:
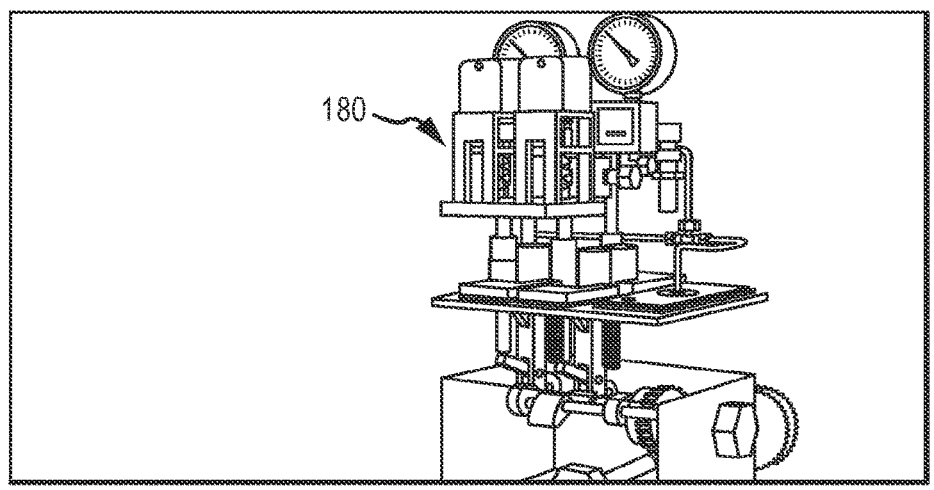
FIG. 35 is a perspective view of a pair of automated pump adjusters with their covers removed.
Figure 36:
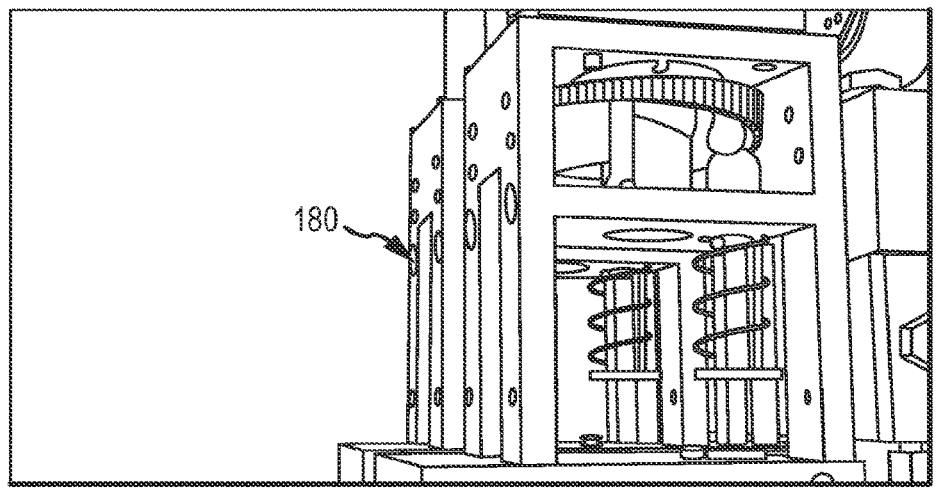
FIG. 36 is an enlarged perspective view of an automated pump adjuster cam in a first position.
Figure 37:
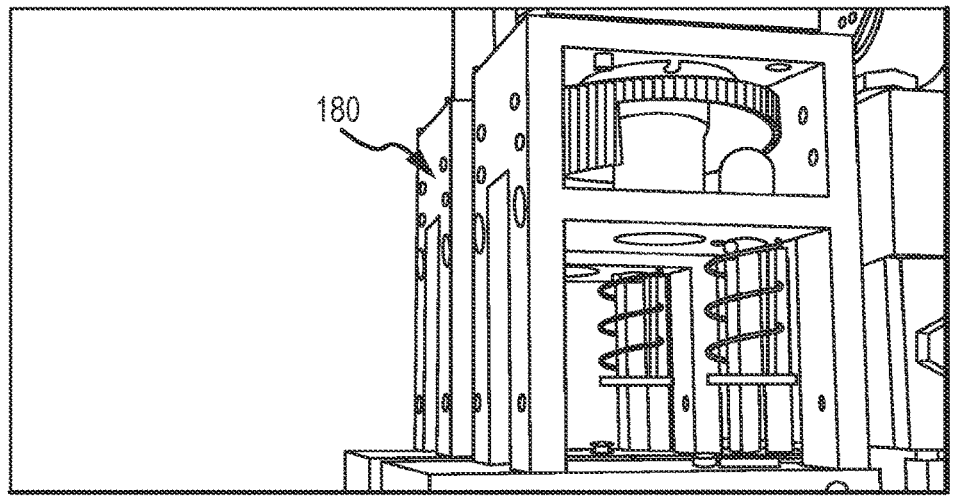
FIG. 37 is an enlarged perspective view of the automated pump adjuster cam in a second position.

With reference to FIGS. 32 and 33, divider block lubrication systems 170 will wear as a result of extended service in high-pressure applications, contamination of the oil or with incorrect maintenance. Wear of the divider block pistons 172 allows oil to bypass to a lube point with less pressure, over lubricating the low pressure point and under lubricating the higher pressure point. The lubrication rate sensors 116 monitor the lubrication rates and alert the operator when it senses a reduction in lubrication rate.

The problem of under and over lubrication is quite often a result of improper manual adjustment of lubricator pumps. The system 100 also may include an automated pump adjuster 180, shown in FIGS. 34-37, that continuously monitors the quantity of oil moving through the system and automatically adjusts the output of the pump as needed. Embodiments of the automated pump adjuster are described above with reference to FIGS. 1A-12A.

One exemplary methodology to automatically adjust the lubricator pumps includes a feedback system. In one embodiment, the lubrication rate sensor 116 sends a signal to a processor, such as processor 131 operating software package 130, indicating the lubrication rate. Processor 131 obtains or calculates the lubrication rate (or an equivalent thereof) and compares the same to a threshold lubrication rate. Threshold lubrication rate may include a low rate, where the system would determine that an increase in lubrication is necessary, and a high rate, where the system would determine that a decrease in lubrication is necessary. The processor would send an appropriate signal to the lubricator pumps to increase the flow rate (fault low) or decrease the flow rate (fault high) until the lubrication rate is determined by processor 131 to be within acceptable levels. In some situations, the flow rate may bounce above and/or below the fault detections. Thus, on a low rate fault detection, the lubricator pump may be supplied an increase flow rate control signal that increases the operation of the pump (on a continuum or step fashion) until the flow rate is not just above the low flow fault level but above a flow rate increase stop level, which may be set higher than the fault level (similar to a hysteresis curve). Thus, the lubricator pump would be operated until flow rate was a predetermined value above the low flow level. Similarly, the high rate may provide a decrease flow rate signal to the lubricator pump until the flow is below a flow rate decrease stop level, which may be set higher than the high fault level (again similar to a hysteresis curve). This may limit the minor adjustments of the pump from continually occurring. In any event, the feedback delay may cause the pump to cycle between a low and high flow occurrence in a harmonic manner until the proper flow is established.

Figure 38:
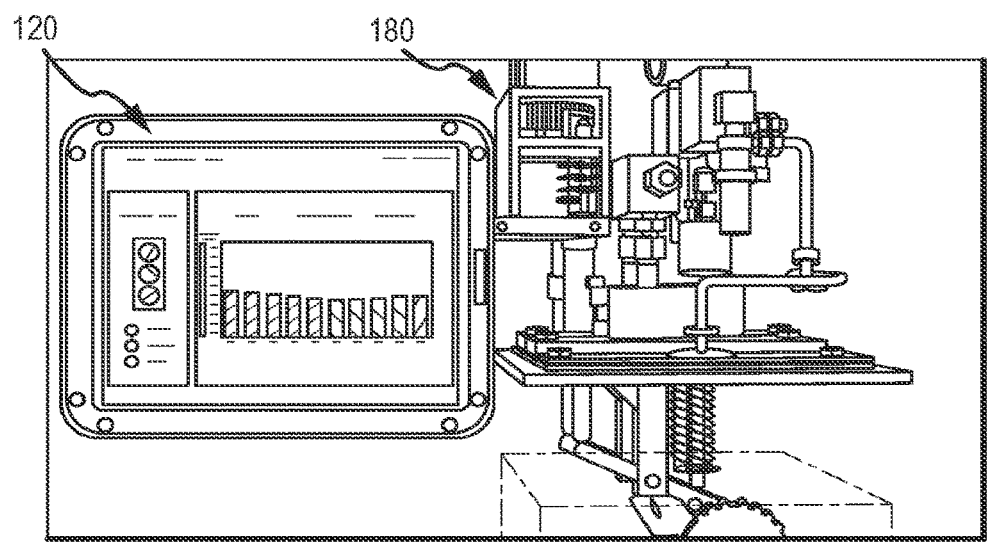
FIG. 38 is a plan view of the system monitor software display indicating pump delivery rates.

Changes to the required lube rate due to changes in compressor speeds are also automatically compensated for. As shown in FIG. 38, if the pump adjuster cannot adequately change the pump rate to deliver the correct quantity of oil, it will signal the monitor 120 to initiate a compressor shut down.

Described herein is a synchronized piston ring lubricator system. The synchronized piston ring lubricator system may be used in conjunction with the above described wear detection and lubrication monitoring system. The synchronized piston ring lubricator system may also be configured as a stand alone system. Lubrication oil is introduced into the cylinders of reciprocating compressors and engines in order to extend the life of the sealing piston rings. In traditional systems, the injection of the lubrication oil is not synchronized to the movement of the piston and can occur at any point in the 360° cycle. The frequency of oil injection is on the order of seconds, for a divider block system this is typically every 10-30 s. A reciprocating compressor or engine typically runs from 300 rpm up to 1500 rpm, hence the period for a single cycle is in the order of 20 mSec-200 mSec. Due to the frequency of the oil injection and the comparably faster cycle time of a compressor or engine, traditional systems can be effectively described as unsystematic in nature. Therefore, in the case of a reciprocating engine, injection can occur during the combustion cycle, which may lead to higher levels of VOC emissions from the engine and the requirement for more lubrication oil.

The synchronized piston ring lubricator system reduces the quantity of lubrication oil for both reciprocating compressors and engines. This also reduces the VOC emissions for reciprocating engines. The system achieves this by synchronizing injection of the lubrication to the piston movement. The location of the piston is determined in a similar manner to that described in U.S. Pat. No. 7,318,350, the disclosure of which is hereby incorporated by reference in its entirety. Alternatively or in addition to, a crankshaft encoder or other position sensor may be used to determine or derive the position of the piston.

Timing and position of the piston is derived via timing revolutions of the piston and knowledge of when the piston is at full extension or top dead center (TDC). Due to this we can inject oil at exact piston angles. Because the system knows where the piston is at any given point in time and through an understanding of the piston geometry the system is able to inject the oil when the piston rings are passing the injection point. This may be implemented by an offset or delay from when the piston was at TDC.

Figure 39:
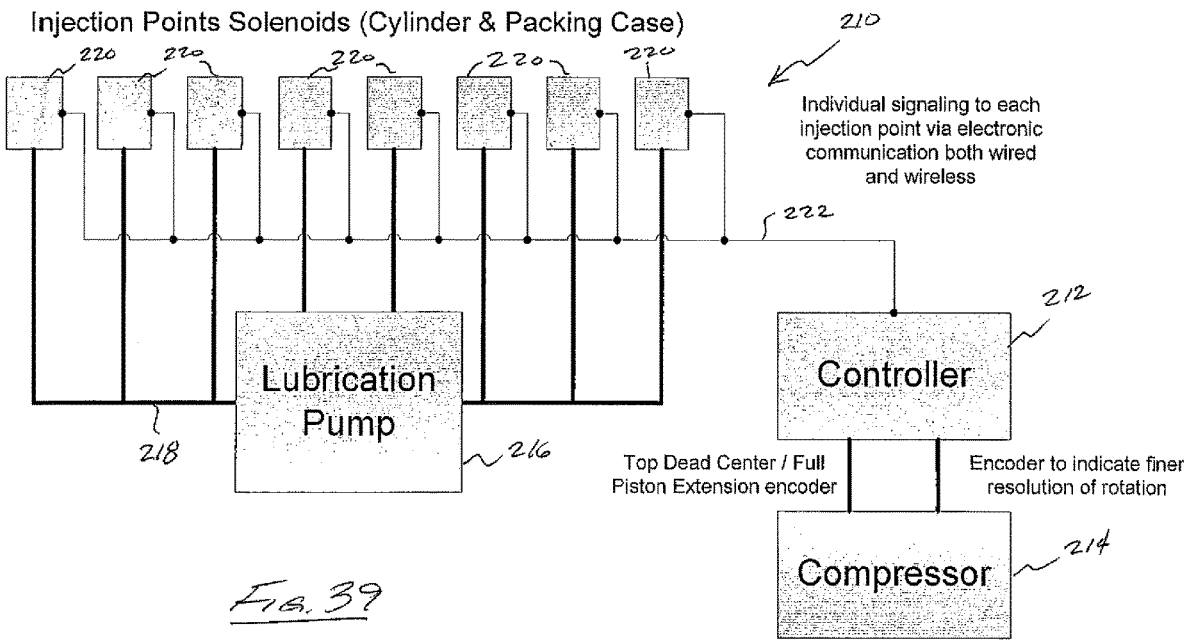
FIG. 39 is a representative schematic illustrating the configuration of the synchronized piston lubricator system.
Figure 40:
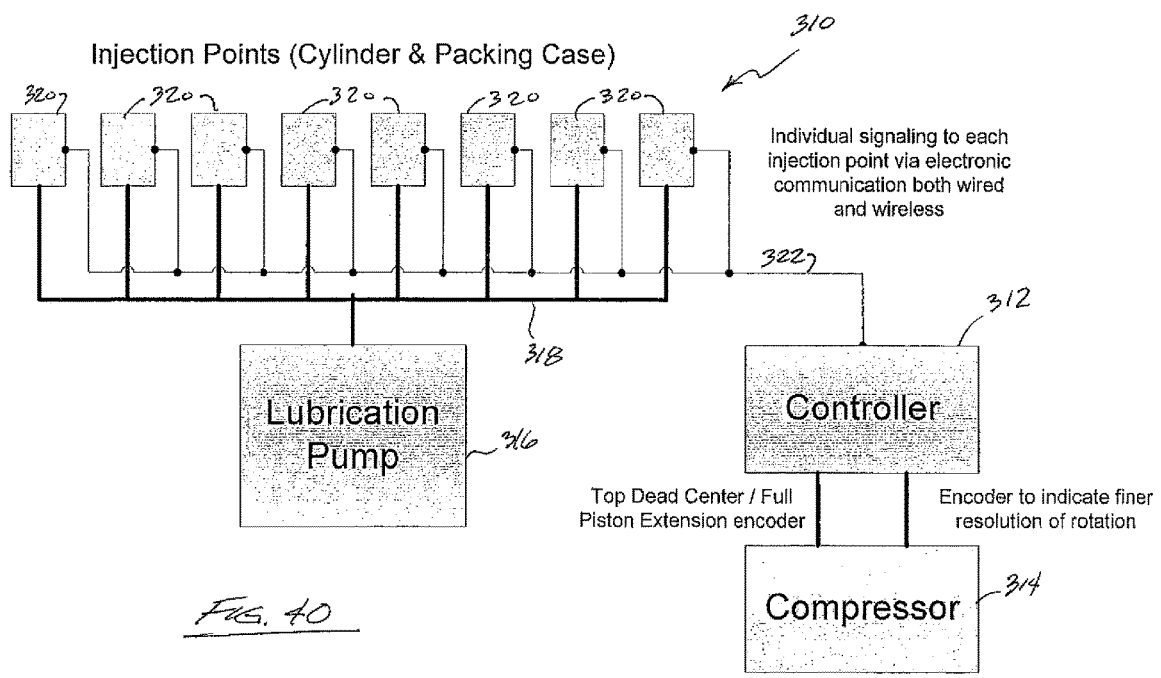
FIG. 40 is a representative schematic illustrating an alternative configuration of the synchronized piston lubricator system.

FIG. 39 illustrates an exemplary configuration of a synchronized piston lubricator system 210. The system 210 includes a lubrication pump 216 that feeds high pressure oil to a plurality of solenoid valves 220. Each valve 220 is actuated by the compressor 214 controller 212 via electrical connections 222. Each valve 220 is activated according to the piston position and timing described above. In this case, each solenoid valve 220 is routed directly to the pump. FIG. 39 illustrates a similar synchronized piston lubricator system 310 in that it includes a lubrication pump 316 that feeds high pressure oil to a plurality of solenoid valves 320. Each valve 320 is actuated by the compressor 314 controller 312 via electrical connections 322. In this case, however, the solenoid valves 320 are supplied by a single pressure line 318 exiting from the lubricator pump 316. Both configurations are acceptable, however, system 310 may require less tubing to implement the system in some applications.

Figure 41:
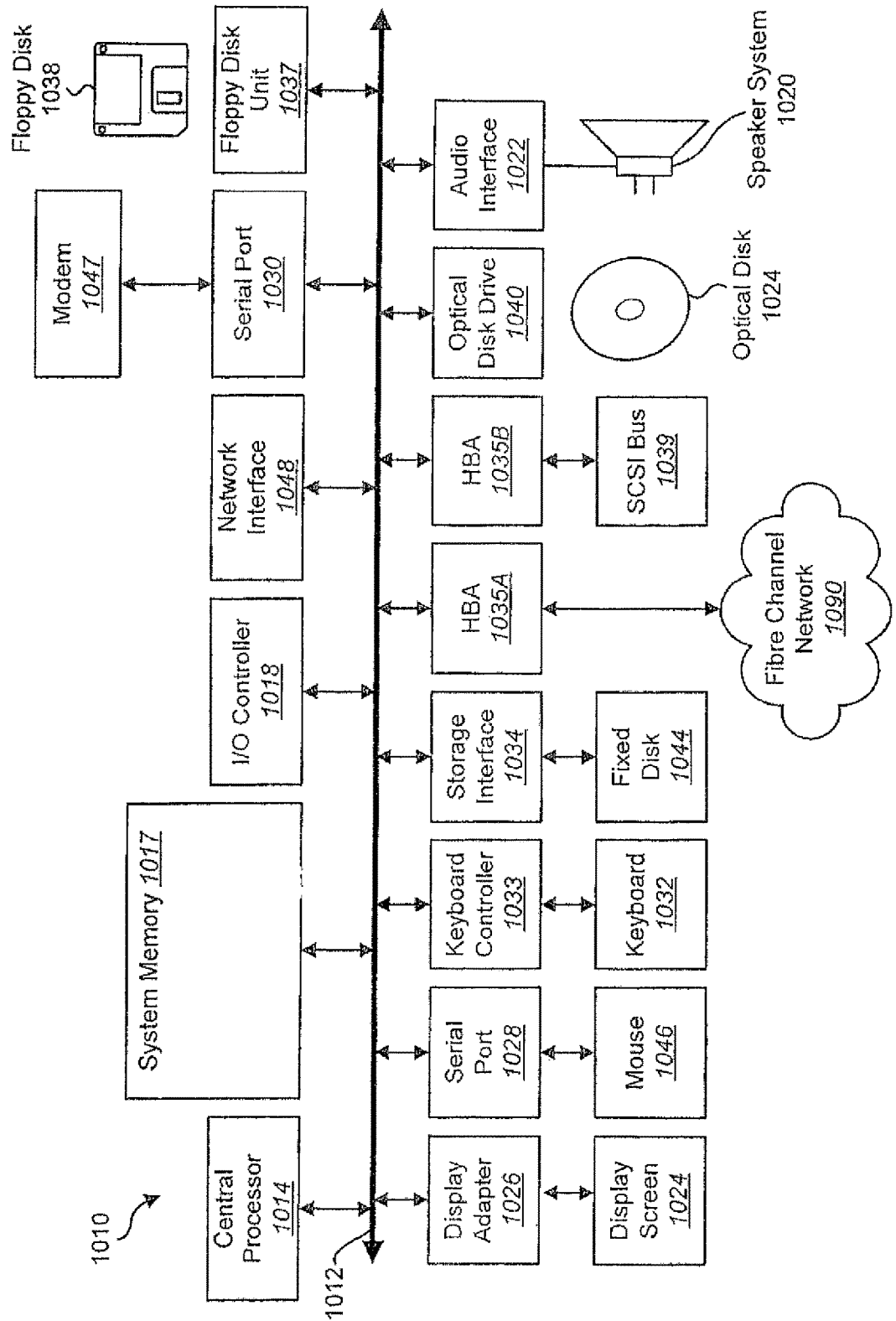
FIG. 41 is a functional block diagram of a system capable of embodying portions of the technology of the present application.

FIG. 41 depicts a block diagram of a computer system 1010 suitable for implementing the present systems and methods. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), multiple USB devices 1092 (interfaced with a USB controller 1090), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the gifting module 104 to implement the present systems and methods may be stored within the system memory 1017. Applications resident with computer system 1010 are generally stored on and accessed via a computer readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1010, can connect to a standard computer readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an Internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 41 need not be present to practice the present systems and methods. The devices and subsystems can be interconnected in different ways from that shown in FIG. 41. The operation of a computer system, such as that shown in FIG. 41, is readily known in the art and is not discussed in detail in this application. Code to implement the present disclosure can be stored in computer-readable medium such as one or more of system memory 1017, fixed disk 1044, optical disk 1042, or floppy disk 1038. The operating system provided on computer system 1010 may be MS-DOS®, MS-WINDOWS®, OS/2®, UNIX®, Linux®, or another known operating system.

Figure 42:
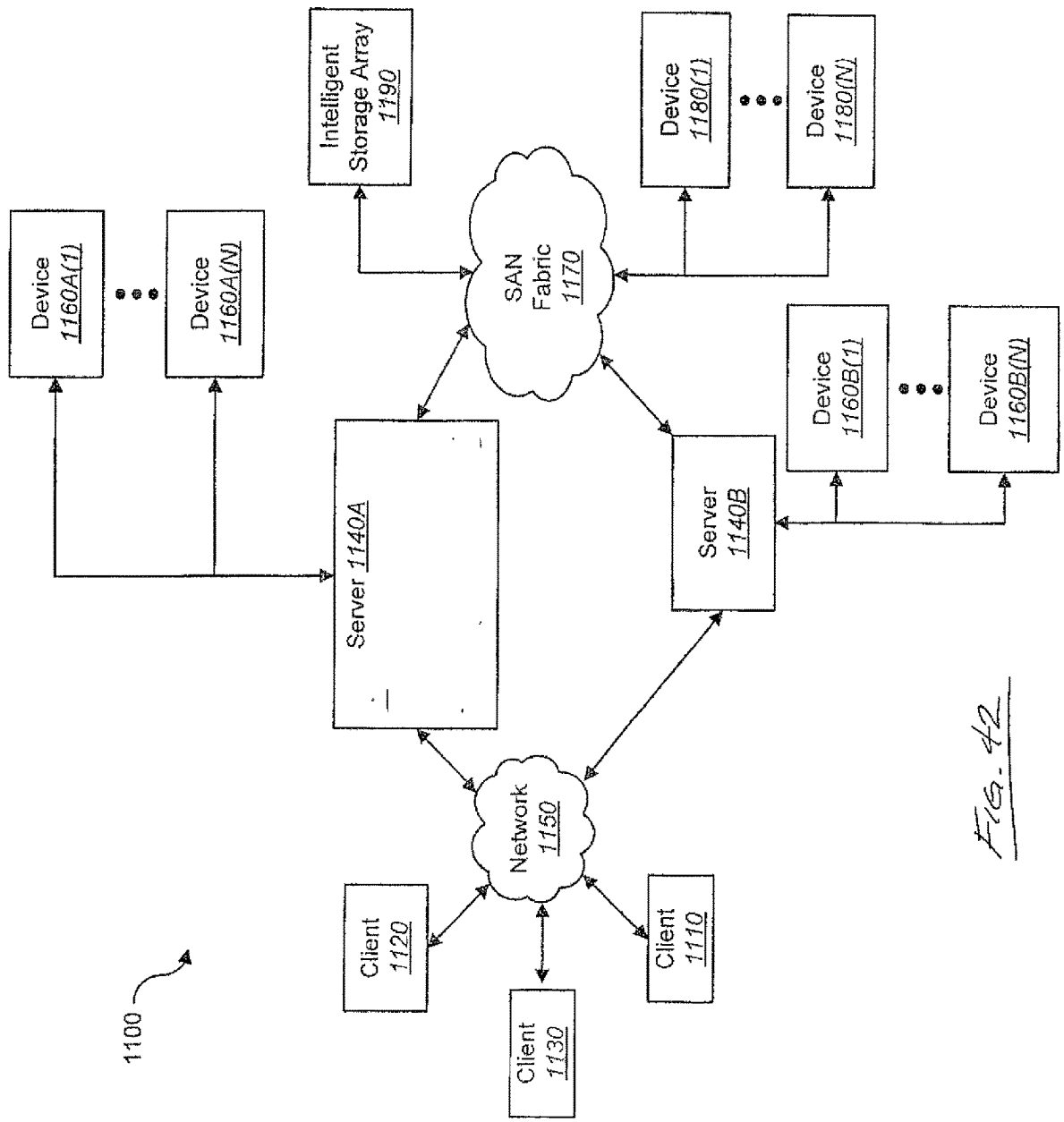
FIG. 42 is a functional block diagram of a system capable of embodying portions of the technology of the present application.

FIG. 42 is a block diagram depicting a network architecture 1100 in which client systems 1110, 1120 and 1130, as well as storage servers 1140A and 1140B (any of which can be implemented using computer system 1110), are coupled to a network 1150. In one embodiment, the gifting module 104 may be located within a server 1140A, 1140B to implement the present systems and methods. The storage server 1140A is further depicted as having storage devices 1160A(1)-(N) directly attached, and storage server 11408 is depicted with storage devices 1160B(1)-(N) directly attached. SAN fabric 1170 supports access to storage devices 1180(1)-(N) by storage servers 1140A and 1140B, and so by client systems 1110, 1120 and 1130 via network 1150. Intelligent storage array 1190 is also shown as an example of a specific storage device accessible via SAN fabric 1170.

With reference to computer system 1010, modem 1047, network interface 1048 or some other method can be used to provide connectivity from each of client computer systems 1110, 1120, and 1130 to network 1150. Client systems 1110, 1120, and 1130 are able to access information on storage server 1140A or 1140B using, for example, a web browser or other client software (not shown). Such a client allows client systems 1110, 1120, and 1130 to access data hosted by storage server 1140A or 1140B or one of storage devices 1160A(1)-(N), 1160B(1)-(N), 1180(1)-(N) or intelligent storage array 1190. FIG. 42 depicts the use of a network, such as the Internet, for exchanging data, but the present systems and methods are not limited to the Internet or any particular network-based environment.

Figure 43:
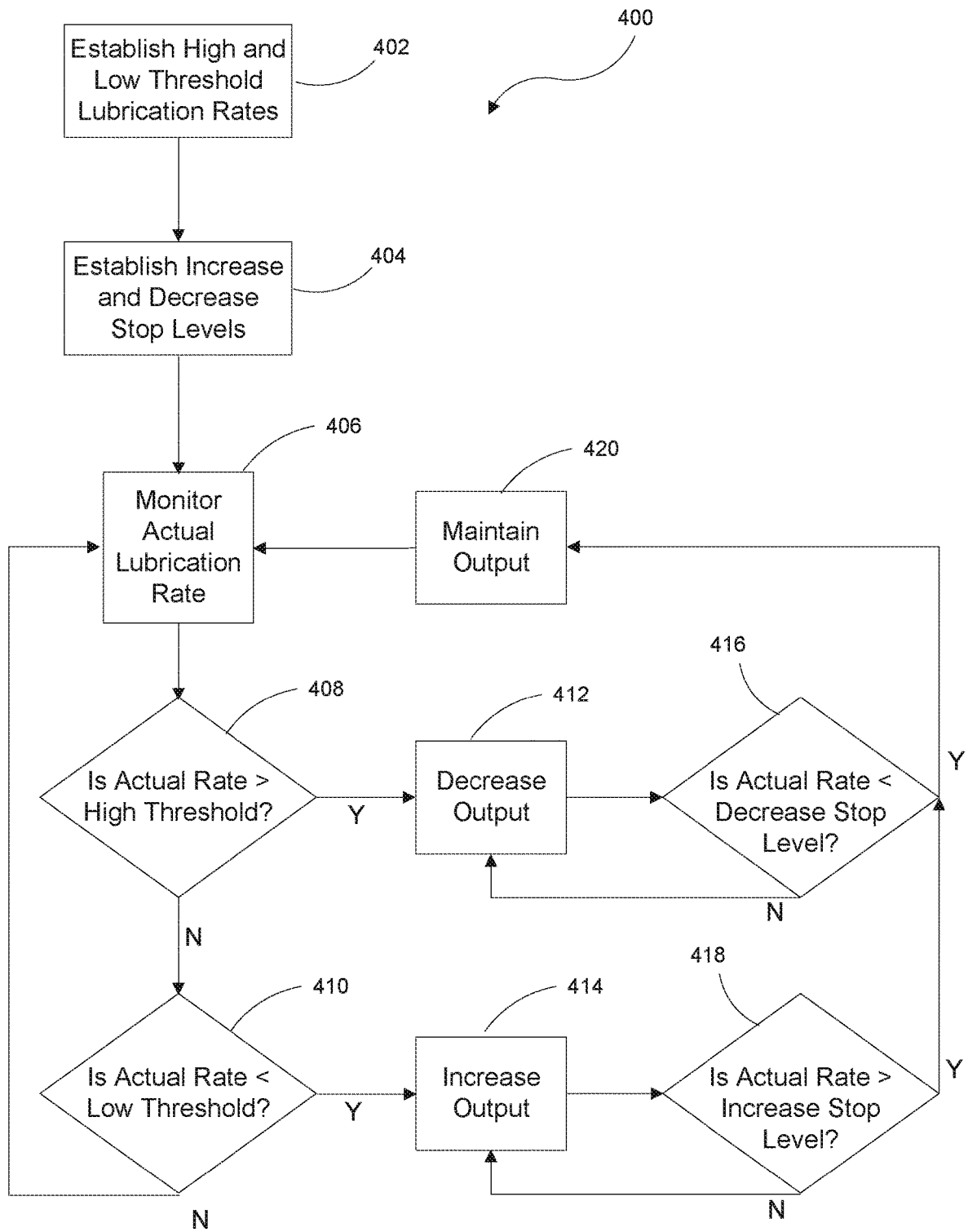
FIG. 43 is a flow diagram illustrating representative method steps for automatically controlling lubricator pumps.

FIG. 43 is a flow diagram illustrating a representative method 400 for automatically adjusting an output of a lubricator pump in accordance with the technology disclosed herein. The method 400 begins with establishing the high and low threshold lubrication rates at step 402. At step 404, the increase and decrease stop levels are established. At step 406 the actual lubrication rate of the lubricator pump is monitored with a flow rate sensor (e.g., sensor 116). At step 408, it is determined if the actual lubrication rate is above or below the high threshold lubrication rate. If the actual rate is greater than the high threshold lubrication rate, then the pump is commanded to decrease output at step 412. At step 416, if the actual rate is less than the decrease stop level after the output is decreased at step 412, then the output is maintained at step 420 and the actual lubrication rate is again monitored at step 406. Otherwise, the output is decreased further at step 412 until the actual rate is less than the decrease stop level. If at step 408 the actual rate is not greater than the high threshold lubrication rate, then it is determined, at step 410, if the actual lubrication rate is above or below the low threshold lubrication rate. If the actual rate is less than the low threshold lubrication rate, then the pump is commanded to increase output at step 414. Otherwise, the actual lubrication rate is again monitored at step 406. At step 418, if the actual rate is greater than the increase stop level after the output is increased at step 414, then the output is maintained at step 420 and the actual lubrication rate is again monitored at step 406. Otherwise, the output is increased further at step 414 until the actual rate is greater than the increase stop level.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Accordingly, the lubricator pump adjuster and wear detection and lubrication monitoring system have been described with some degree of particularity directed to the exemplary embodiments. It should be appreciated; however, that the present invention is defined by the following claims construed in light of the prior art so that modifications or changes may be made to the exemplary embodiments without departing from the inventive concepts contained herein.

What is claimed is:

1. A method for automatically adjusting an output of a lubricator pump, the method comprising:
    establishing a low rate threshold and a high rate threshold;
    establishing an increase stop level higher than the low rate threshold, and a decrease stop level lower than the high rate threshold and different from the increase stop level;
    monitoring, with a flow rate sensor, an actual lubrication rate at the output of the lubricator pump;
    determining whether the actual lubrication rate is above the high rate threshold or below the low rate threshold;
    causing the lubricator pump to decrease a lubricator pump output when the actual lubrication rate is determined to be above the high rate threshold until the actual lubrication rate is at the decrease stop level;
    causing the lubricator pump to increase the lubricator pump output when the actual lubrication rate is determined to be below the low rate threshold until the actual lubrication rate is at the increase stop level; and
    maintaining the lubricator pump output when the actual lubrication rate is not above the high rate threshold or below the low rate threshold.

2. The method of claim 1 wherein at least one of the low rate threshold, high rate threshold, increase stop level, and decrease stop level is determined based on a speed of a compressor being lubricated.

* * * * *